(12) United States Patent
Capotosto et al.

(10) Patent No.: US 12,385,578 B2
(45) Date of Patent: Aug. 12, 2025

(54) BUOYANCY MODULE

(71) Applicant: DEEPWATER BUOYANCY, INC., Biddeford, ME (US)

(72) Inventors: David A Capotosto, Biddeford, ME (US); Matthew J Aubin, Lebanon, ME (US); Shawn C Agren, Madison, ME (US); Edward H Maxsimic, II, Arundel, ME (US); Daniel Cote, Lyman, ME (US)

( * ) Notice: Subject to any disclaimer, the term of this patent is extended or adjusted under 35 U.S.C. 154(b) by 61 days.

(21) Appl. No.: 18/115,568

(22) Filed: Feb. 28, 2023

(65) Prior Publication Data

US 2023/0279969 A1 Sep. 7, 2023

Related U.S. Application Data

(60) Provisional application No. 63/315,313, filed on Mar. 1, 2022.

(51) Int. Cl.
*F16L 1/24* (2006.01)
*E21B 17/01* (2006.01)

(52) U.S. Cl.
CPC .............. *F16L 1/24* (2013.01); *E21B 17/012* (2013.01)

(58) Field of Classification Search
CPC .............. F16L 1/20; F16L 1/24; E21B 17/012
USPC ....................................................... 405/171
See application file for complete search history.

(56) References Cited

U.S. PATENT DOCUMENTS

| 4,048,686 | A |   | 9/1977 | Ege | |
|---|---|---|---|---|---|
| 4,646,840 | A | * | 3/1987 | Bartholomew | E21B 17/012 405/195.1 |
| 5,711,639 | A | * | 1/1998 | Tessier | F16L 33/04 24/483 |
| 6,030,145 | A | * | 2/2000 | Stewart, Jr. | E21B 17/015 405/172 |
| 6,270,387 | B1 | * | 8/2001 | Nesheim | E21B 17/012 405/211 |
| 7,214,114 | B2 | * | 5/2007 | Gibson | E21B 17/012 441/133 |
| 7,744,314 | B2 | * | 6/2010 | Eide | F16L 1/24 405/224.2 |
| 7,771,245 | B2 | * | 8/2010 | Routeau | E21B 17/012 441/133 |

(Continued)

FOREIGN PATENT DOCUMENTS

GB 2551788 A * 1/2018 .......... E21B 17/012

*Primary Examiner* — Frederick L Lagman
(74) *Attorney, Agent, or Firm* — Tredecim LLC; Sean L. Sweeney

(57) ABSTRACT

Disclosed herein are novel buoyancy modules for attachment to a cable, pipe, or umbilical. The buoyancy modules include a pair of module bodies adapted to mate with each other. Each module body has a recess adapted to engage a single bolt tensioner and at least one of the module bodies includes a longitudinal channel running the length of the module body. Further, the module bodies include one or more pads positioned within a pad containment channel. A plurality of single bolt tensioners may be positioned within the recesses of the module bodies and tensioned to impart a compressive force such that the module bodies contact each other, generating a predetermined displacement of the pad and thereby imparting a known clamping force that results in a desired clamping pressure being applied by the pad to the cable pipe or umbilical.

12 Claims, 17 Drawing Sheets

(56) References Cited

U.S. PATENT DOCUMENTS

| | | | |
|---|---|---|---|
| 8,500,502 B2* | 8/2013 | Benedetti | F16L 1/24 |
| | | | 441/133 |
| 8,573,888 B2 | 11/2013 | Denniel et al. | |
| 9,022,827 B2 | 5/2015 | Snyder, II | |
| 9,103,472 B2 | 8/2015 | Laborde et al. | |
| 9,353,579 B2* | 5/2016 | Tan | E21B 17/012 |
| 9,428,969 B2* | 8/2016 | Harbison | F16B 2/08 |
| 9,941,029 B2 | 4/2018 | Mackay et al. | |
| 10,533,684 B2* | 1/2020 | Harrop | F16L 1/24 |
| 11,555,358 B1* | 1/2023 | Mason | E21B 17/01 |
| 2009/0036008 A1* | 2/2009 | Watkins | B63B 22/00 |
| | | | 441/1 |
| 2009/0272855 A1* | 11/2009 | Oram | F16L 33/04 |
| | | | 248/67.5 |
| 2013/0280973 A1* | 10/2013 | Elder | F16L 1/24 |
| | | | 441/133 |
| 2020/0215805 A1* | 7/2020 | Milne | F16L 3/1066 |
| 2020/0386059 A1* | 12/2020 | Skaarsjoe | F16L 1/24 |

* cited by examiner

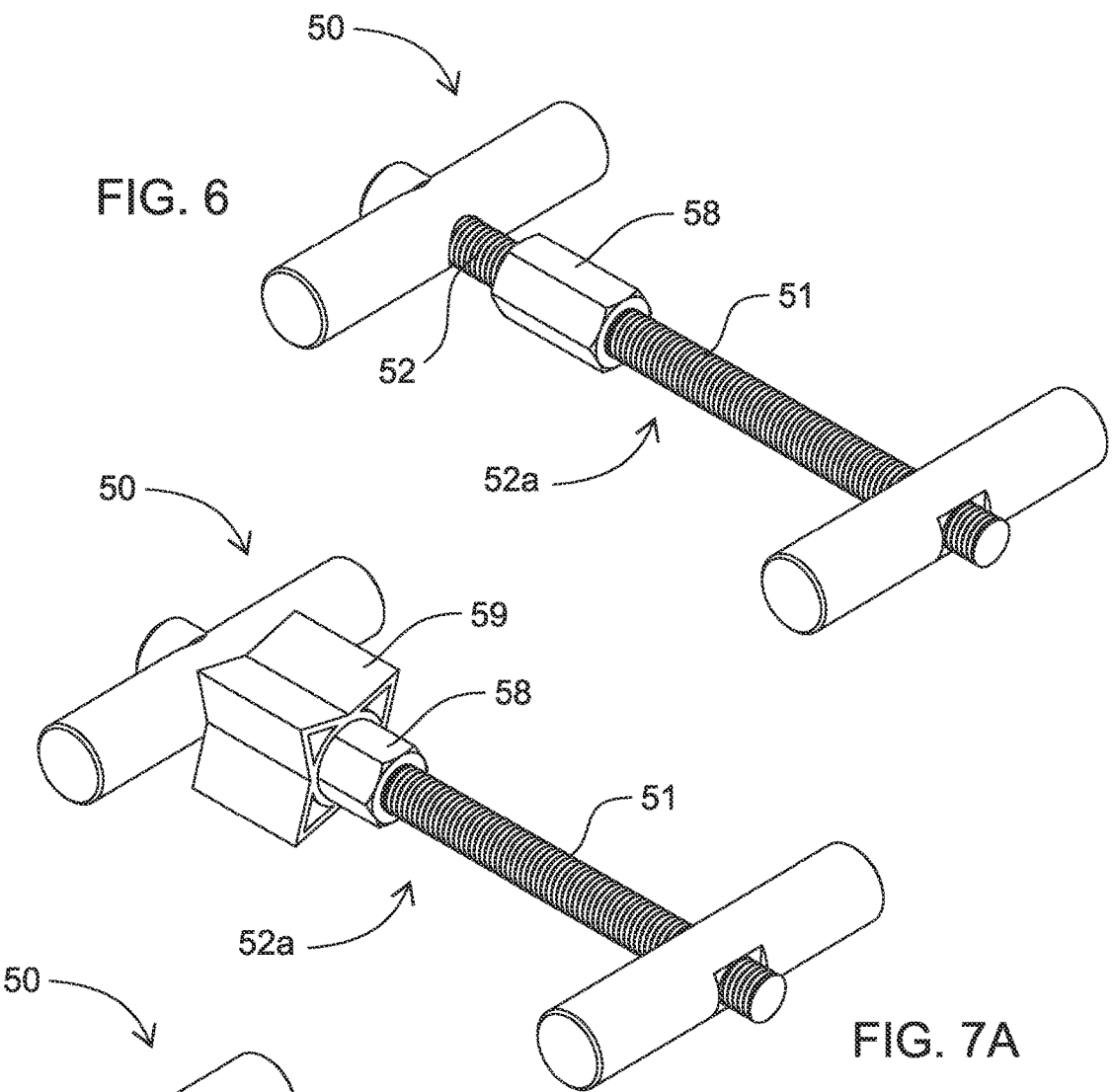
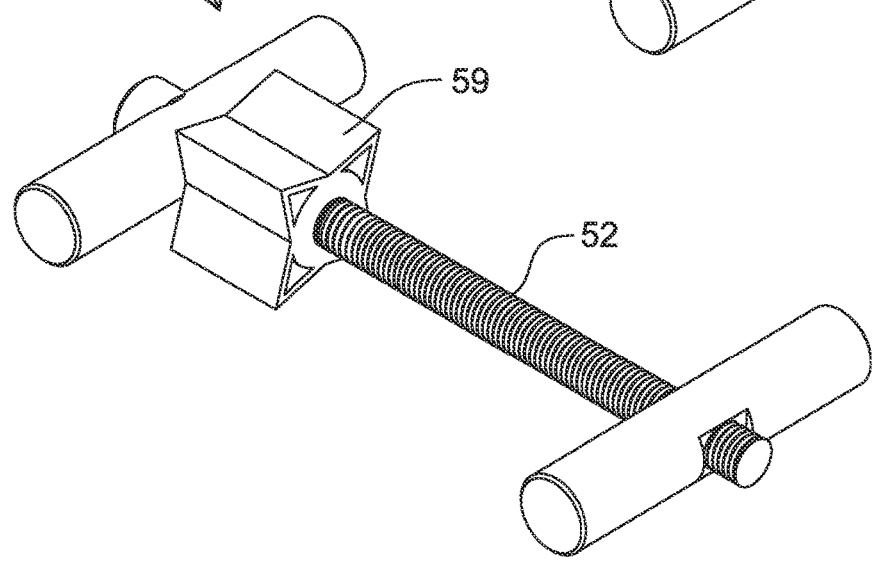
FIG. 6
FIG. 7A
FIG. 7

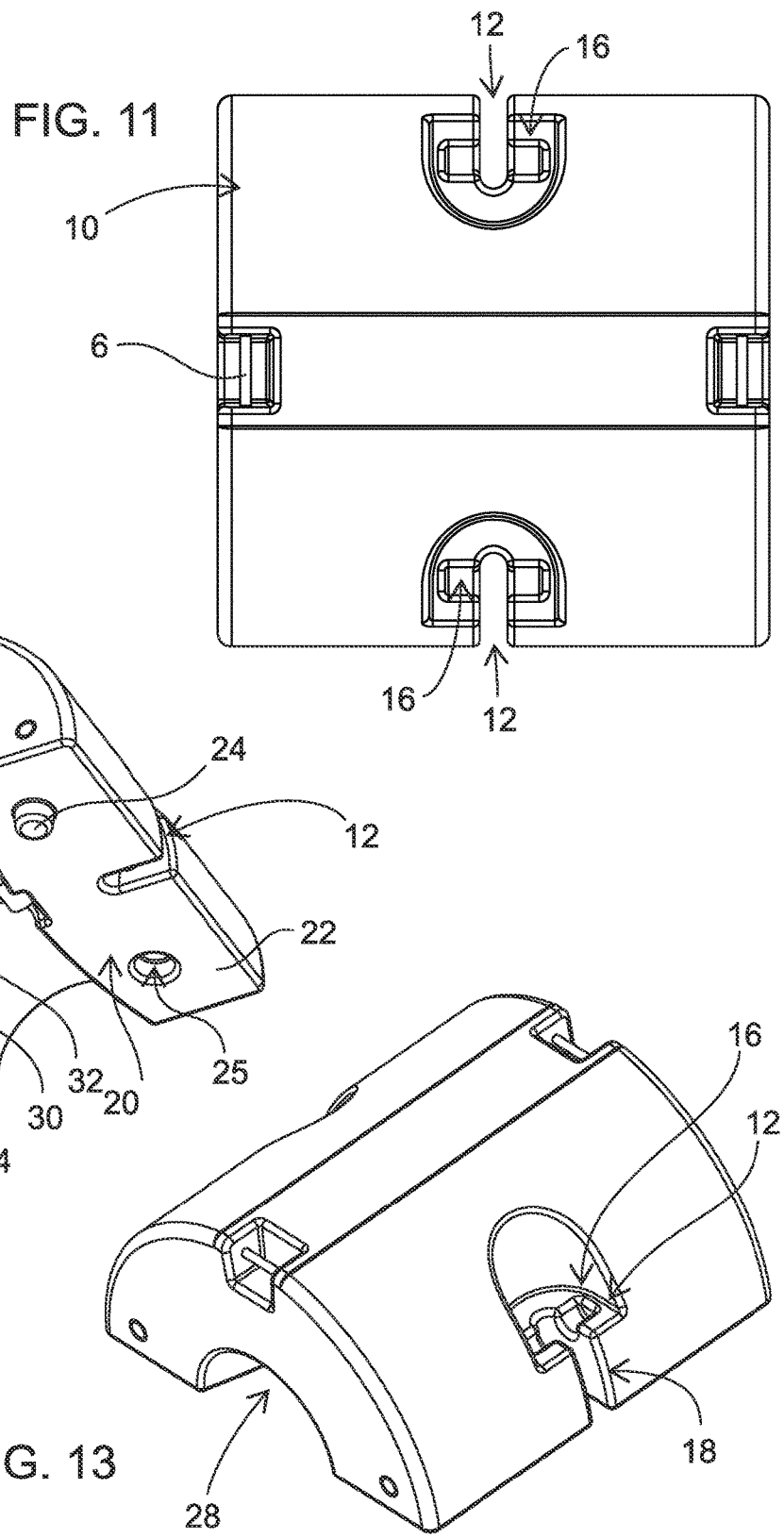

BUOYANCY MODULE

CROSS-REFERENCE TO RELATED APPLICATIONS

This application claims the benefit of U.S. Provisional Application No. 63/315,313, filed Mar. 1, 2022, the disclosure of which is herein incorporated by reference.

BACKGROUND

1. Field of the Invention

The present invention pertains to the field of buoyancy modules. Specifically, this invention relates to a novel buoyancy module and method that facilitates accurate and efficient installation of the buoyancy module in connection with a range of offshore applications.

2. Discussion of Background Information

Buoyancy modules are a critical component of offshore activities. For example, offshore floating oil and gas platforms, and floating offshore wind platforms all require buoyancy modules in connection with components such as cables, umbilicals, and flow lines.

In offshore wind applications, buoyancy modules are installed in a precise manner to provide distributed buoyancy for cables and umbilicals. For example, buoyancy modules hold cables in a desired geometric configuration and can reduce top tension loads as well as support compliance in the cable during movement of a floating platform. Once installed, buoyancy modules are expected to remain in service for up to 30 years. Thus, they must be installed with great precision and must retain their installation specifications despite the unrelenting subsea environment.

Existing buoyancy module designs fall generally within two categories: buoyancy modules that utilize a separate clamping mechanism and buoyancy modules with an integrated clamping mechanism. Further, it is customary for buoyancy modules to be comprised of a plurality of bodies, which are secured together during the installation process. However, to achieve the desired performance and longevity, the clamping mechanism of the buoyancy modules must be secured to the cable, pipe, or umbilical with a precise tensioning force. Typically, this tensioning force is achieved by utilizing a large hydraulic tool and then maintained via bolts, crimped corrosion-resistant metal bands, such as an INCONEL™ bands, or high-tension fiber straps coupled with single or double bolt tensioners.

Given the nature of the required tooling, installation of buoyancy modules is completed on land whenever possible. However, where installation must occur at sea, the process is cumbersome and labor intensive and significantly complicates the process of deploying the required cables, pipes, and umbilicals. In addition, the difficulties associated with offshore buoyancy module installation are known to increase the duration of the deployment process and cause frequent vessel stoppages, both of which can significantly increase project costs. While other devices and methods have been proposed for buoyancy modules, none of these inventions, taken either singly or in combination, adequately address or resolve the aforementioned problems. Therefore, a need exists for an improved buoyancy module that accurately and efficiently attaches to a cable, pipe, or umbilical.

SUMMARY OF THE INVENTION

The present invention solves the problems associated with the installation of buoyancy modules and provides a device and method facilitates accurate and efficient installation of the buoyancy module in connection with a range of offshore applications.

The invention is directed to a buoyancy module that facilitates accurate and efficient installation of the buoyancy module in connection with a range of offshore applications. The buoyancy module comprises a first and second module body, the first module body adapted to mate with the second module body, wherein each module body includes at least one recess comprising an upper portion and a bolt channel; a longitudinal channel running the length of at least the first module body, the longitudinal channel having a pad containment channel located therein; a pad positioned within the pad containment channel; and at least one single bolt tensioner, the at least one single bolt tensioner comprising a bolt, a cylindrical washer, and a cylindrical nut, wherein the at least one single bolt tensioner is positioned such that the bolt lies within the bolt channel of the first module body and the bolt channel of the second module body.

The present invention is also directed to a buoyancy module comprising a module body having at least one recess comprising an upper portion and a bolt channel; a longitudinal channel running the length of the module body, the longitudinal channel having a pad containment channel located therein; a pad positioned within the pad containment channel; at least one single bolt tensioner comprising a bolt, a cylindrical washer, and a cylindrical nut, the cylindrical washer or the cylindrical nut captured within a recess bore in the at least one recess of the module body.

The present invention is also directed to a method for accurately and efficiently installing a buoyancy module in connection with a range of offshore applications. The method comprises a first step of providing a buoyancy module comprising a first and second module body, the first module body adapted to mate with the second module body, wherein each module body includes a plurality of recesses, each recess comprising an upper portion and a bolt channel; a longitudinal channel running the length of at least the first module body, the longitudinal channel having a pad containment channel located therein; a pad positioned within the pad containment channel; and a first and second single bolt tensioner, each of the first and second single bolt tensioner comprising a bolt, a cylindrical washer, and a cylindrical nut. A second step includes positioning the first and second module body about a cable, pipe, or umbilical such that the cable, pipe, or umbilical lies within the longitudinal channel of the first module body and contacts the pad. A third step includes positioning the first and second single bolt tensioner such that each bolt is located within the bolt channel of the first and second module body and each cylindrical nut is positioned in a recess of one of the first and second module body and each cylindrical washer is positioned in a recess of the other of the first and second module body. A fourth step includes tensioning the first and second single bolt tensioner.

The present invention is also directed to a method for accurately and efficiently installing a buoyancy module comprising a first step of providing a buoyancy module comprising a first and second module body, the first module body adapted to mate with the second module body, wherein each module body includes at least one recess comprising an upper portion and a bolt channel; a longitudinal channel running the length of at least the first module body, the longitudinal channel having a pad containment channel located therein; a pad positioned within the pad containment channel; and a single bolt tensioner comprising a bolt, a cylindrical washer, and a cylindrical nut, and a hinge single bolt tensioner comprising a bolt, a cylindrical washer, and a cylindrical nut wherein where the cylindrical washer of the hinge single bolt tensioner is captured in a recess bore in the recess of the first module body and the cylindrical nut of the hinge single bolt tensioner is captured within a recess bore in the recess of the second module body. A second step includes positioning the cable, pipe, or umbilical within the longitudinal channel of the first module body and in contact with the pad. A third step includes rotating the second module body to mate with the first module body and positioning the single bolt tensioner such that the bolt is located within the bolt channel of the first and second module body, the cylindrical washer is positioned within the recess of the first module body, and the cylindrical nut is positioned within the recess of the second module body. A fourth step includes tensioning the single bolt tensioner and the hinge single bolt tensioner.

The present invention is also directed to a method for accurately and efficiently installing a buoyancy module comprising a first step of providing a buoyancy module comprising a first, second, and third module body, the first, second, and third module body adapted to mate with each other to form a desired geometric shape, each of the first, second, and third module body including a plurality of recesses, each recess comprising an upper portion and a bolt channel; a longitudinal channel running the length of each of the first, second, and third module body, the longitudinal channel having a pad containment channel located therein; a pad positioned within each containment channel; and a first and second single bolt tensioner, each of the first and second single bolt tensioner comprising a bolt, a cylindrical washer, and a cylindrical nut; a hinge single bolt tensioner, the hinge single bolt tensioner comprising a bolt, a cylindrical washer and a cylindrical nut, wherein the cylindrical washer is captured within a recess bore in the recess of either the first module body or the second module body and the cylindrical nut is captured within a recess bore in the recess of the other of the first module body or the second module body. A second step includes positioning the cable, pipe, or umbilical within the longitudinal channel of the first module body and in contact with the pad. A third step includes rotating the second module body such that the cable, pipe, or umbilical is positioned within the longitudinal channel and in contact with the pad of the second module body. A fourth step includes positioning the third module body in an orientation that mates with the first and second module body to form the desired geometric shape. A fifth step includes positioning the first single bolt tensioner such that the bolt is located within the bolt channel of the first module body and the bolt channel of the third module body, the cylindrical washer is positioned within the recess of one of the first and third module body, and the cylindrical nut is positioned within the recess of the other of the first and third module body. A sixth step includes positioning the second single bolt tensioner such that the bolt is located within the bolt channel of the second module body and the bolt channel of the third module body, the cylindrical washer is positioned within the recess of one of the second and third module body, and the cylindrical nut is positioned within the recess of the other of the second and third module body. A seventh step includes tensioning the first and second single bolt tensioner and the hinge single bolt tensioner.

BRIEF DESCRIPTION OF THE DRAWINGS

These and other features, aspects and advantages of the present invention will become better understood with reference to the following description, appended claims, and accompanying drawings where:

FIG. 6 is a perspective view of a single bolt tensioner of the present invention.

FIG. 7 is a perspective view of a single bolt tensioner of the present invention.

FIG. 7a is a perspective view of a single bolt tensioner of the present invention.

FIG. 11 is a top view of a module body of the present invention.

FIG. 12 is a perspective bottom view of a module body of the present invention.

FIG. 13 is a perspective top view of a module body of the present invention.

DETAILED DESCRIPTION OF THE INVENTION

The present device and method is directed to the problem of accurately and efficiently connecting buoyancy modules to cables, pipes, and umbilicals in offshore applications. Specifically, the present invention provides a device comprised of a pair of module bodies secured together using a plurality of single bolt tensioners, and a method of use that efficiently and accurately secures the buoyancy module to a cable, pipe, or umbilical.

The present invention addresses the problems surrounding the installation of buoyancy modules. Offshore environments, such as oil and gas platforms and offshore wind farms rely on buoyancy modules to impart engineered shapes into subsea components such as cables, pipes, and umbilicals. These buoyancy modules must be installed to precise specifications in order to function as required during the operational life of the attached subsea component. The present invention addresses these needs by providing a device that accurately and efficiently attaches to subsea components such as cables, pipes, and umbilicals.

Figure 1:
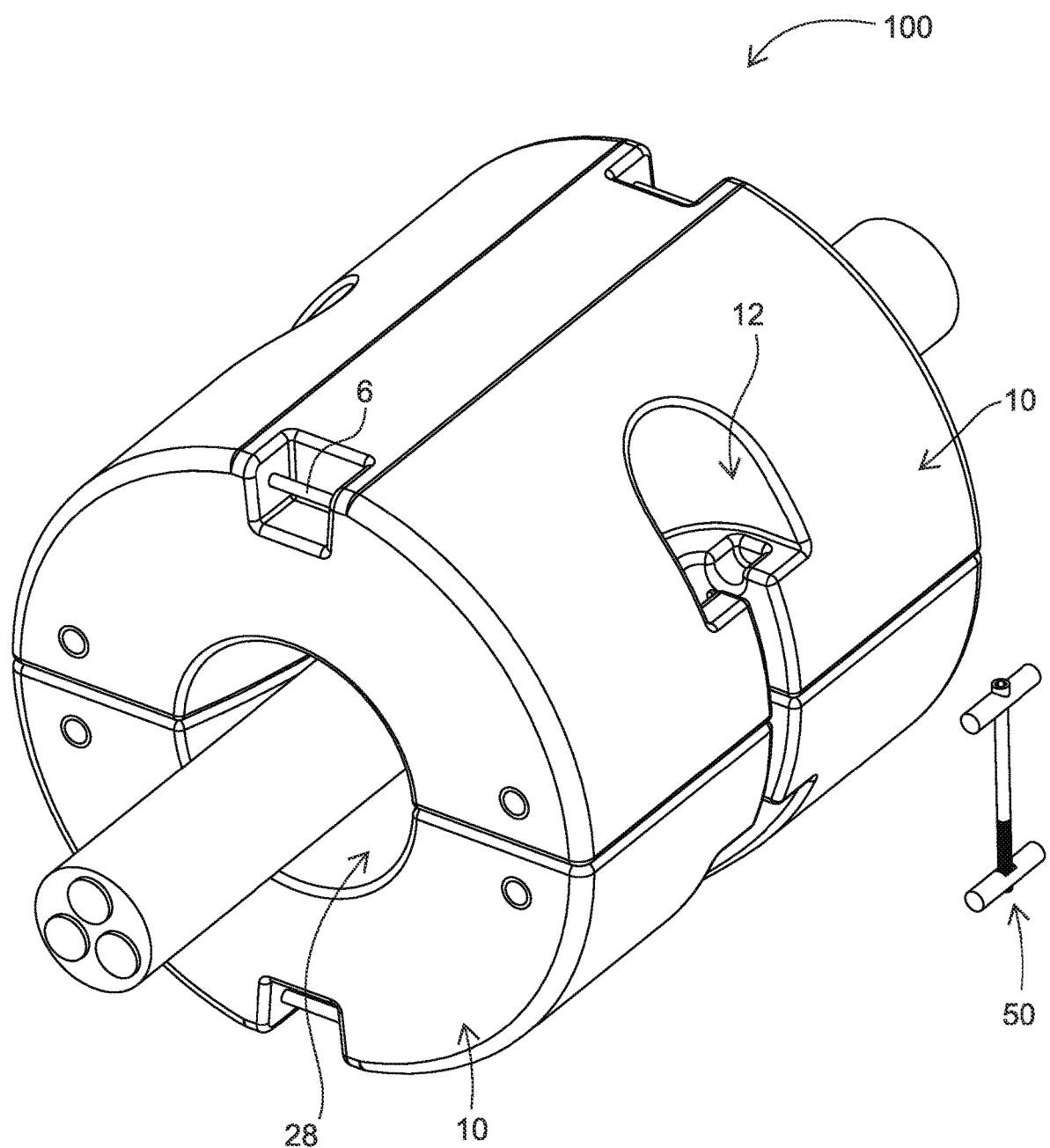
FIG. 1 is a perspective view of a buoyancy module of the present invention.
Figure 2:
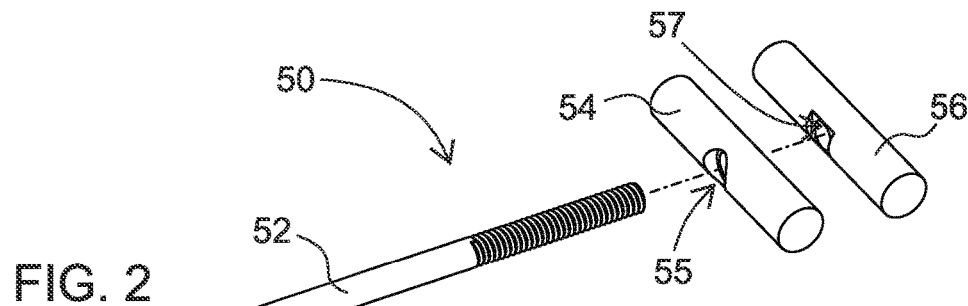
FIG. 2 is a perspective exploded view of a single bolt tensioner of the present invention.
Figure 3:
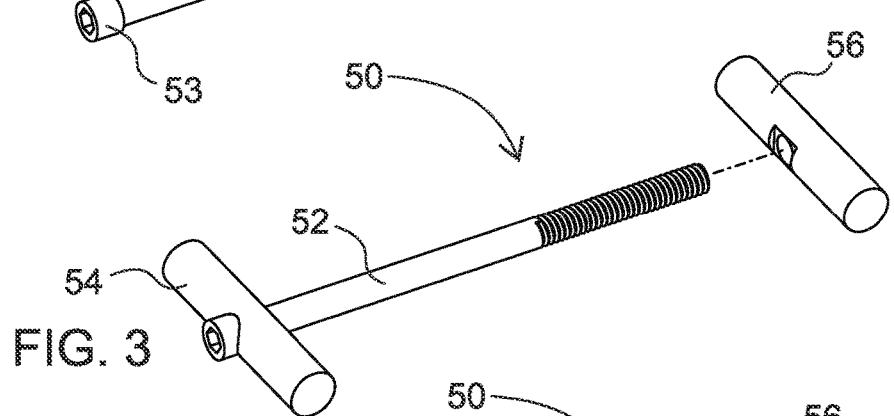
FIG. 3 is a perspective view of a single bolt tensioner of the present invention.
Figure 4:
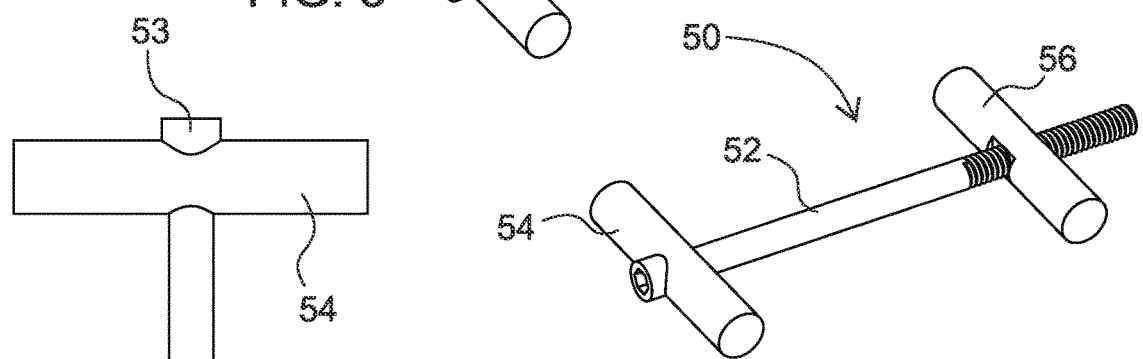
FIG. 4 is a perspective view of a single bolt tensioner of the present invention.
Figure 5:
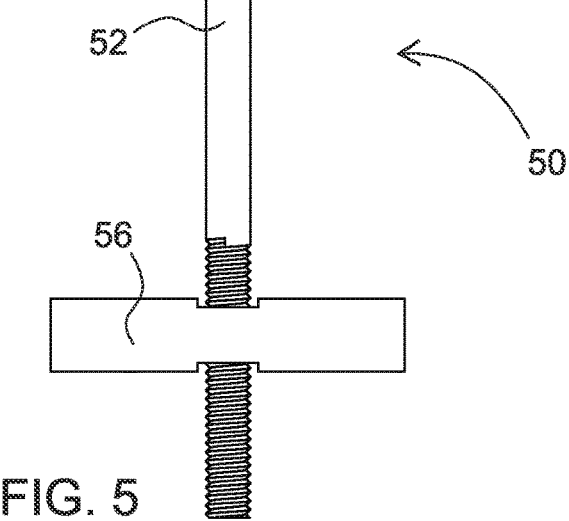
FIG. 5 is a front view of a single bolt tensioner of the present invention.
Figure 8:
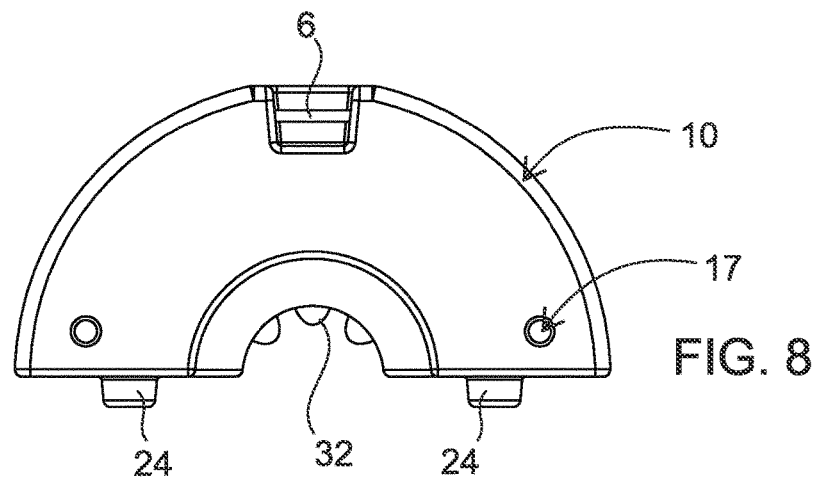
FIG. 8 is a front view of a module body of the present invention.
Figure 9:
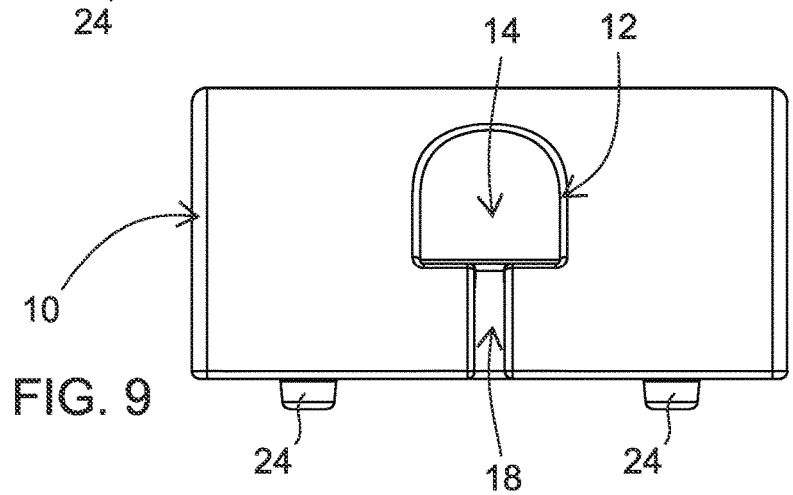
FIG. 9 is a side view of a module body of the present invention.
Figure 10:
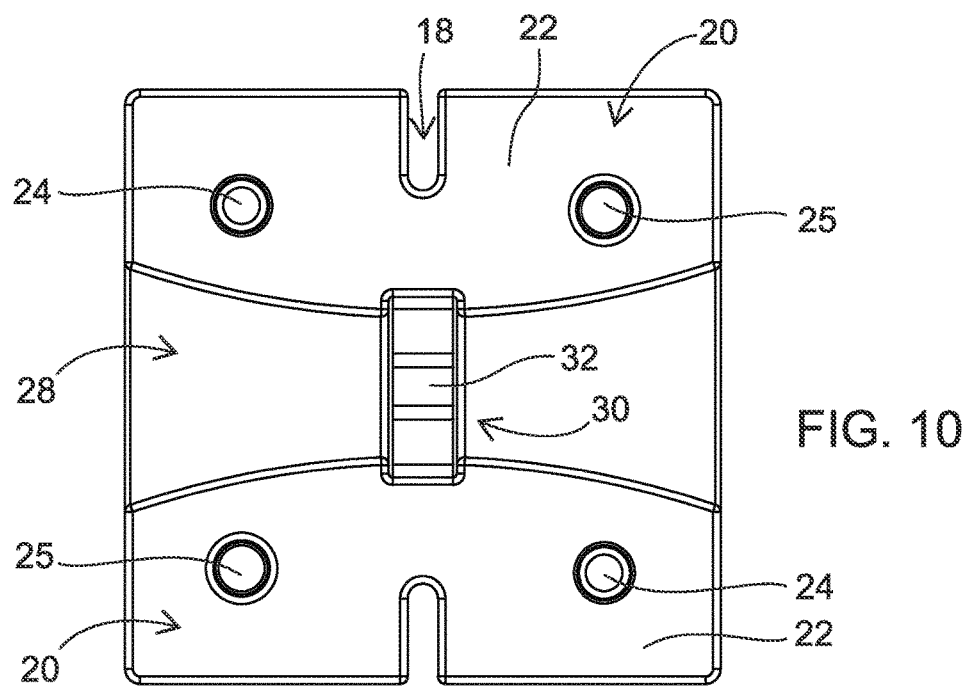
FIG. 10 is a bottom view of a module body of the present invention.

Turning to FIG. 1, a buoyancy module 100 of the present invention is shown. The buoyancy module 100 includes a pair of module bodies 10 and a pair of single bolt tensioners 50. As depicted in FIGS. 2-5, the single bolt tensioner 50 includes a bolt 52, a cylindrical washer 54 and a cylindrical nut 56. The bolt 52 passes through a bore 55 in the cylindrical washer 54 and is secured to the cylindrical nut 56 via a tapped bore 57. In some embodiments, the dimensions of the cylindrical washer 54 and the cylindrical nut 56 are the same. The bolt head 53 may be of any head style known in the art and is sized such that the bolt head 53 cannot pass through the bore 55 in the cylindrical washer 54. As depicted in FIGS. 6, 7 and 7a, it may be advantageous to utilize an extended bolt 52a, where the length of the bolt 52 is extended using a threaded extension 51 and a threaded coupler 58. The threaded coupler 58 may be secured using any form known in the art. For example, the threaded coupler 58 may be secured using a physical lock washer, an adhesive, or a combination of both. As will be understood by a person of skill in the art, an extended bolt 52a may be used in lieu of a bolt 52 in any of the embodiments of the single bolt tensioner 50 disclosed herein without deviating from the scope of the invention.

In some embodiments, the bolt tensioner 50 may include an alignment nut 59. The alignment nut 59 is located along the length of the bolt 52 and is sized and shaped such that sufficient frictional force exists to restrict the rotation of alignment nut 59 relative to the bolt 52. Preferably, the alignment nut 59 is unthreaded and maintains its position on the bolt via frictional forces. The alignment nut 59 may be made of any material known in the art. For example, the alignment nut 59 may be made of plastic, nylon, PVC, or an elastomeric material. Further, in some embodiments utilizing an extended bolt 52a, it may be advantageous for the alignment nut 59 to surround the bolt 52 and a portion of the threaded coupler 58 such that the alignment nut 59 functions as a stop that limits the ability of the bolt 52 to slide within the bore 55.

Turning to FIGS. 8-13, each of the module bodies 10 are shown as substantially semicylindrical in shape and designed to mate with each other to form a buoyancy module 100 with a substantially cylindrical shape as depicted in FIG. 1. However, the buoyancy module 100 may be shaped in any geometric form as known in the art. For example, the buoyancy module 100 may be substantially spherical, substantially elliptical, or substantially rectangular. The module bodies 10 are sized according to the buoyancy requirements of the application. For example, the module bodies 10 are generally in the range of about three to about six feet in diameter and about three to about six feet in length, with in-air weights in the range from about two hundred to about two thousand pounds.

Although the module bodies 10 are shown as being substantially semicylindrical in shape, the module bodies 10 may be any shape required to achieve the desired geometric form of the buoyancy module 100. In addition, while the buoyancy module 100 is shown comprising substantially symmetrical module bodies 10, a person of skill in the art will appreciate that in some embodiments of the invention the module bodies 10 may be different shapes provided they mate to form the desired buoyancy module 100 configuration and geometric shape. For example, a substantially cylindrical buoyancy module 100 may be comprised of a first module body 10 that is substantially u-shaped and a second module body 10 that is designed to mate with the first module body 10 to complete the substantially cylindrical buoyancy module 100. Further, the buoyancy module 100 may be comprised of any plurality of module bodies 10. For example, rather than utilizing a u-shaped module body 10 and a second module body 10 designed to complete a substantially cylindrical buoyancy module 100 as described above, it may be advantageous to utilize three module bodies 10 that mate to form the desired buoyancy module 100.

The module bodies 10 are manufactured as known in the art. For example, the exterior of the module body 10 may be molded plastic, with the interior filled with a foam. The foam may be any foam known to a person of skill in the art. For example, the foam may be syntactic foam. In addition, the module body 10 may include inserts such as handling points 6. To achieve the desired strength and structural integrity, inserts may be installed in the module body 10 shell prior to filling the interior with foam. By extending the inserts into the interior of the module body 10, the addition of the foam surrounds the insert, stabilizing the insert and distributing load forces.

Each module body 10 includes a pair of recesses 12 located in the lateral surface area of the module body 10. The recesses 12 include an upper portion 14, which has a cradle 16 adapted to engage the cylindrical washer 54 and cylindrical nut 56 elements of the single bolt tensioner 50. When the cylindrical nut 56 is positioned within the upper portion 14 of the recess 12, the wall of the recess 12 prevents the cylindrical nut 56 from rotating as the bolt 52 is tightened during the initial stage of bolt 52 tightening. As the bolt 52 is tightened further, the cylindrical nut 56 enters the cradle 16, which secures the cylindrical nut 56 and generates a compression force between the module bodies 10. The recess 12 further includes a bolt channel 18, which extends from the upper portion 14 of the recess 12 to the face 20 of the module body 10. The bolt channel 18 is an open channel that is sized and shaped to allow the bolt 52 to pass between the cradle 16 to the adjacent buoyancy module 10. Further, in embodiments where the single bolt tensioner 50 includes an alignment nut 59, the alignment nut is sized and shaped to fit within the bolt channel 18 such that the alignment nut 59 can slide within the bolt channel 18 without rotating. Accordingly, the frictional forces between the alignment nut 59 and the bolt 52 resist rotation of the bolt 52 relative to the bolt channel 18.

As best shown in FIG. 12, the face 20 of the module body 10 includes a pair of mating surfaces 22, with a longitudinal channel 28 running the length of the module body 10. The longitudinal channel 28 is sized and shaped to accept a cable, pipe, or umbilical and may be flared at the ends to accommodate the minimum bend radius of the cable, pipe, or umbilical. Transverse to the longitudinal channel 28 is a pad containment channel 30. The pad containment channel 30 is sized and shaped to accept a pad 32. The pad containment channel 30 may be recessed within the longitudinal channel 28 or the pad containment channel 30 may be formed using walls or a series of protrusions extending from the longitudinal channel 28, provided that the pad containment channel 30 interacts with the pad 32 to maintain the position of the pad 32 and prevents the pad from displacing axially.

Once the buoyancy module 100 is installed, the pad 32 is in direct contact with the cable, pipe, or umbilical and resists axial displacement of the buoyancy module 100 along the cable, pipe, or umbilical during the service life of the buoyancy module 100. Accordingly, it is desirable for the pad 32 to be an elastomeric pad comprised of a high friction material such as EPDM rubber, neoprene rubber, natural rubber, or polyurethane. The shape and size of the pad 32 may be adapted to the specific application for the buoyancy module 100. For example, the pad 32 may be a single segment or the pad 32 may be comprised of multiple segments. Further, the pad 32 may be shaped to conform to the cable, pipe, or umbilical upon installation.

The mating surfaces 22 may include one or more alignment protrusions 24 and one or more alignment recesses 25. The alignment protrusions 24 may be any shape and size known in the art and are preferably intended to mate with a corresponding alignment recess 25 disposed in the mating module body 10. For example, FIG. 12 depicts an embodiment where each mating surface 22 includes an alignment protrusion 24 and an alignment recess 25, with the alignment protrusion 24 tapered slightly to facilitate entry of the alignment protrusion 24 into a corresponding alignment recess 25 of the mating module body 10.

Figure 14:
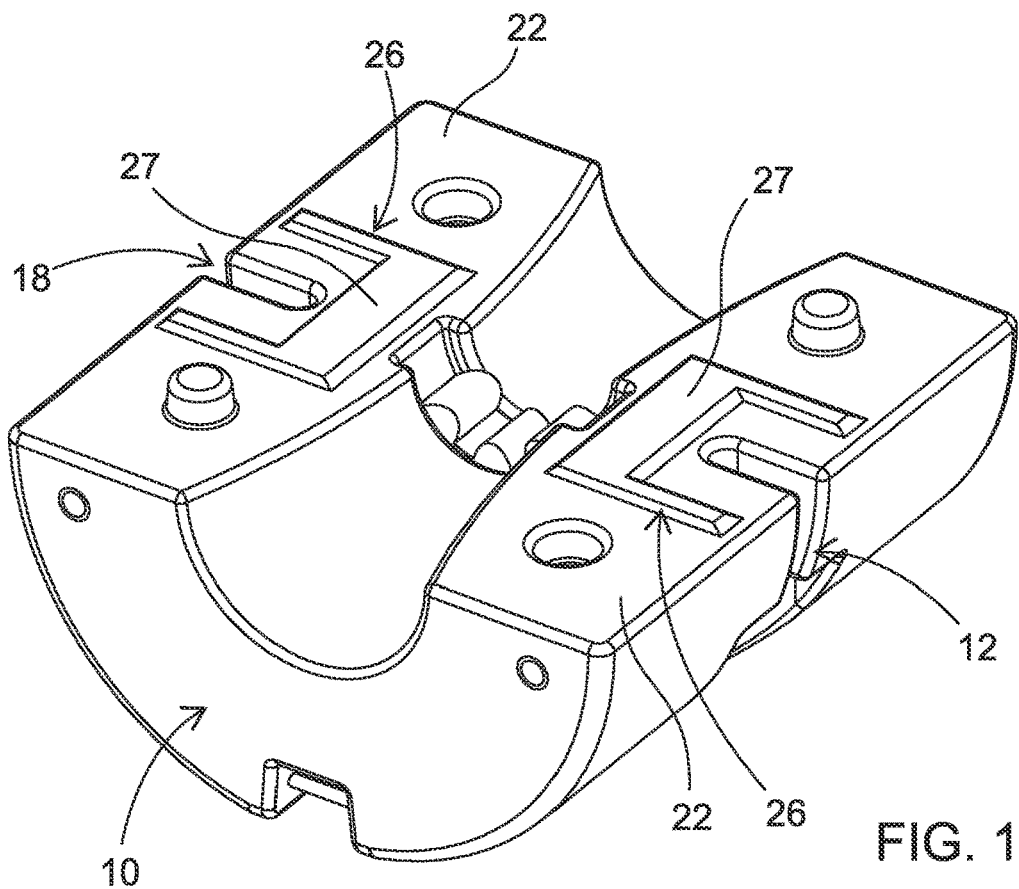
FIG. 14 is a bottom perspective view of a module body of the present invention.
Figure 15:
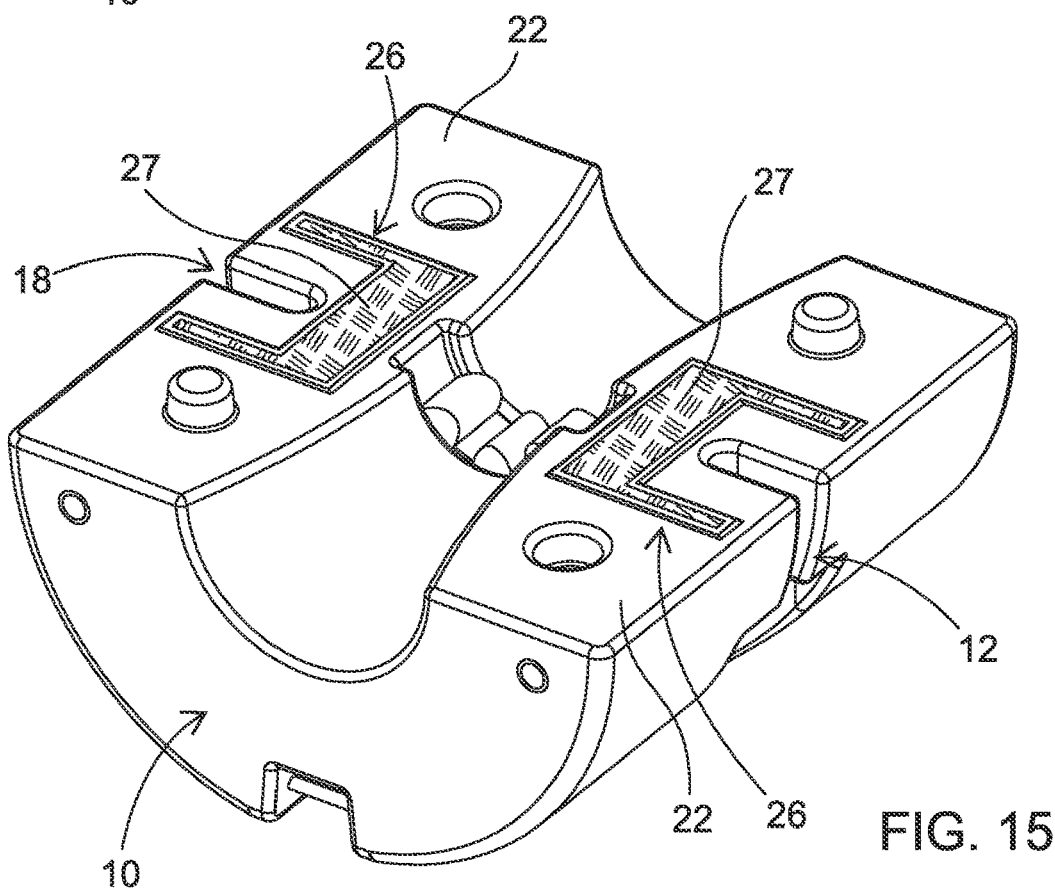
FIG. 15 is a bottom perspective view of a module body of the present invention.

As depicted in FIGS. 14 and 15, the mating surfaces 22 may include one or more contact surfaces 26, which are portions of the mating surface 22 that are intended to contact when two module bodies 10 are mated to form a buoyancy module 100. In some embodiments, the contact surfaces 26 may correspond to the entirety of the mating surfaces 22. However, in other embodiments, such as the embodiments depicted in FIGS. 14 and 15, the contact surfaces 26 are a portion of the mating surfaces 22. Where the contact surfaces 26 are a portion of the mating surfaces 22, the contact surface 26 may be manufactured to extend above the mating surface 22. Further, a raised contact surface 26 may be machined to remove material from the contact face 27 of the contact surface 26 to achieve a high degree of precision with regard to the height of the contact surface 26. In some embodiments, the contact surface 26 may be machined to remove the entire external shell of the module body 10 from the contact face 27. In these embodiments, the contact face 27 will be comprised of the internal foam, which in the case of syntactic foam, will possess a high compressive strength.

During installation, two module bodies 10 are mated to form the buoyancy module 100. Several embodiments of the present invention are envisioned, depending on the configuration of the single bolt tensioners 50.

Figure 16:
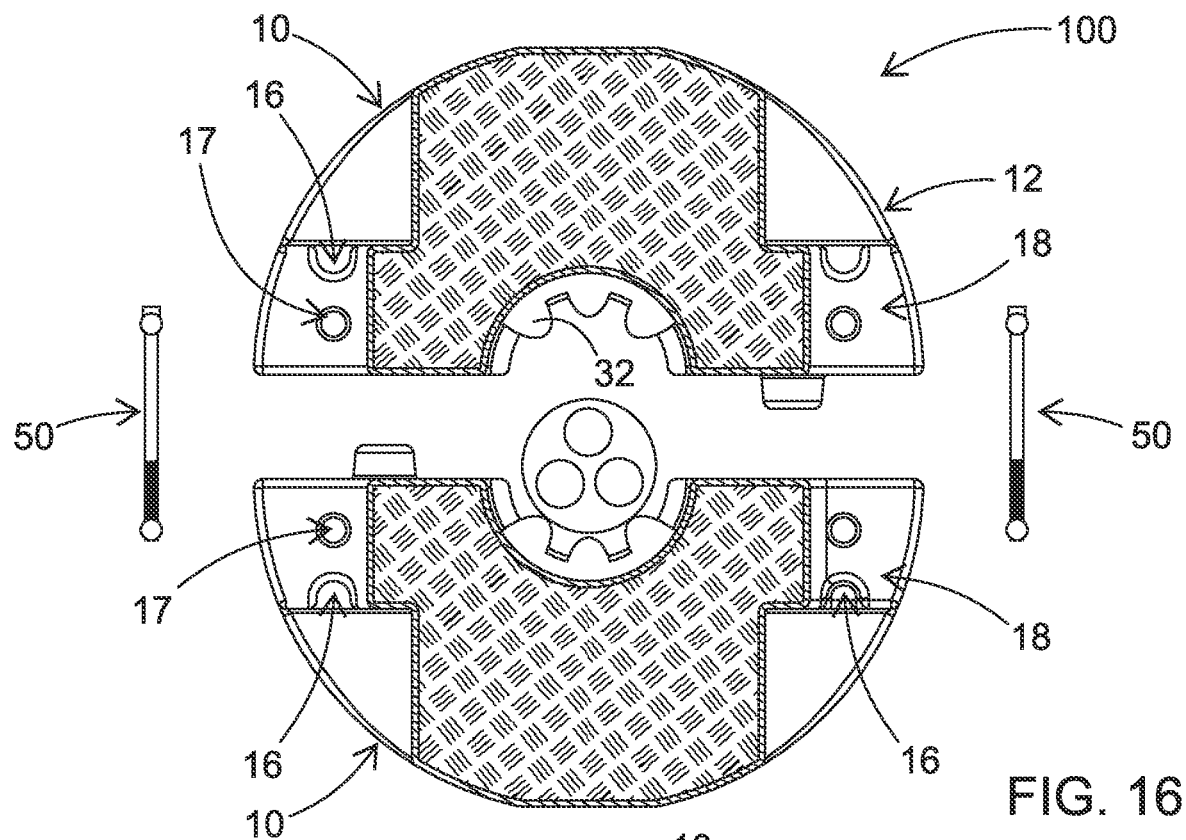
FIG. 16 is a cross section view of a buoyancy module of the present invention.
Figure 17:
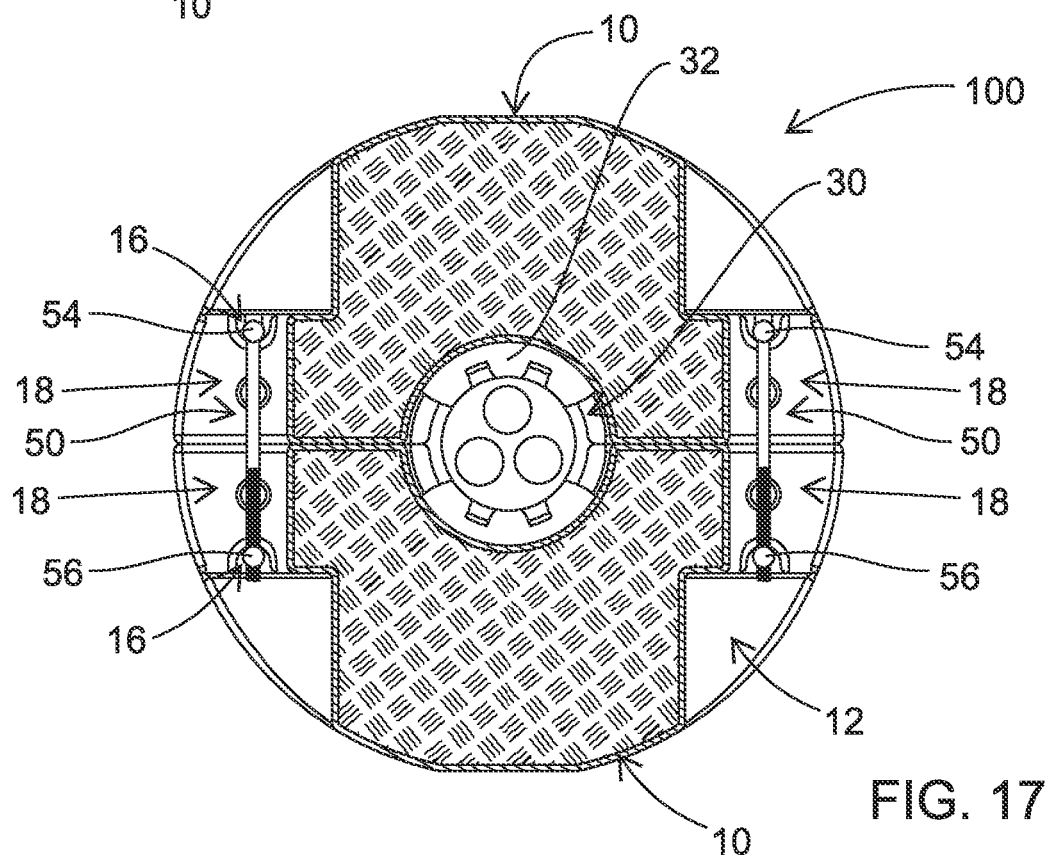
FIG. 17 is a cross section view of a buoyancy module of the present invention.
Figure 18:
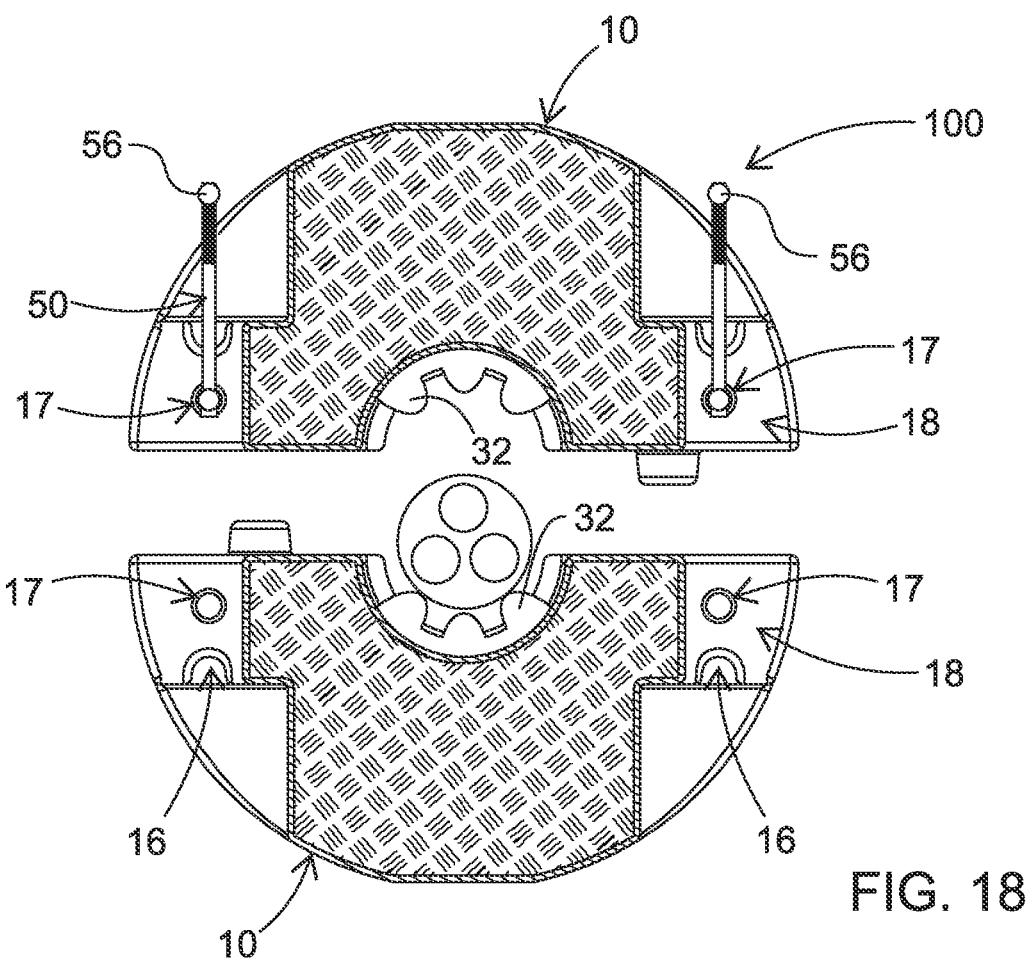
FIG. 18 is a cross section view of a buoyancy module of the present invention.
Figure 19:
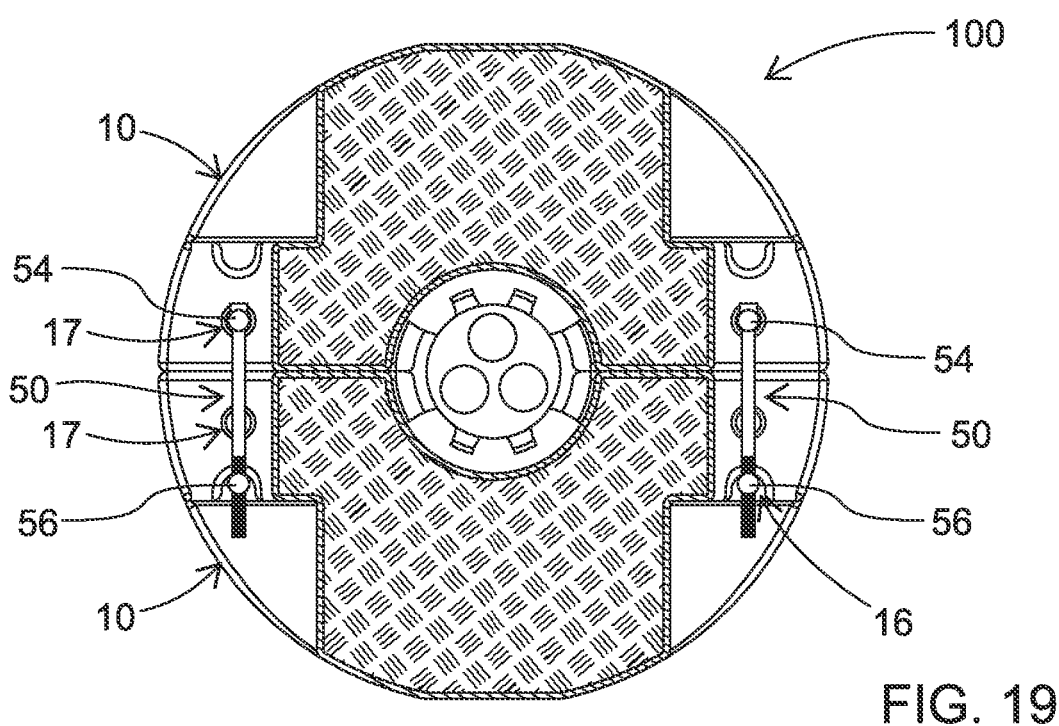
FIG. 19 is a cross section view of a buoyancy module of the present invention.
Figure 20:
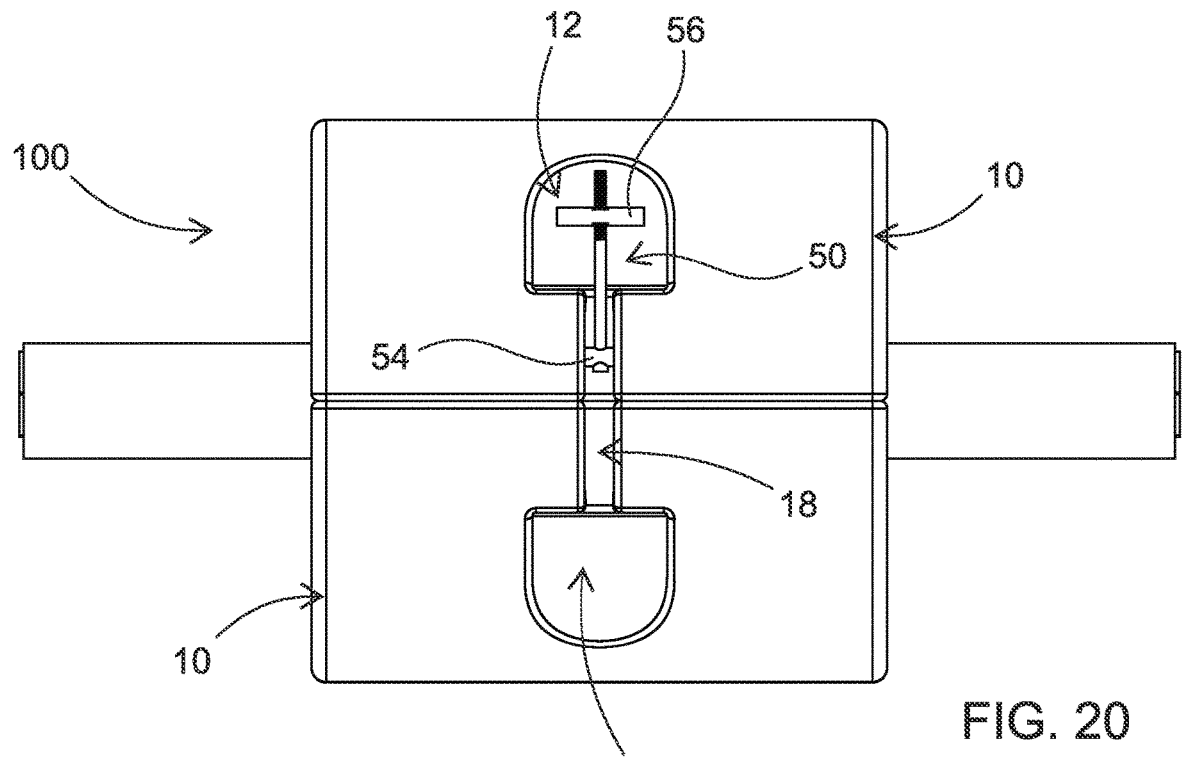
FIG. 20 is a side view of a buoyancy module of the present invention.
Figure 21:
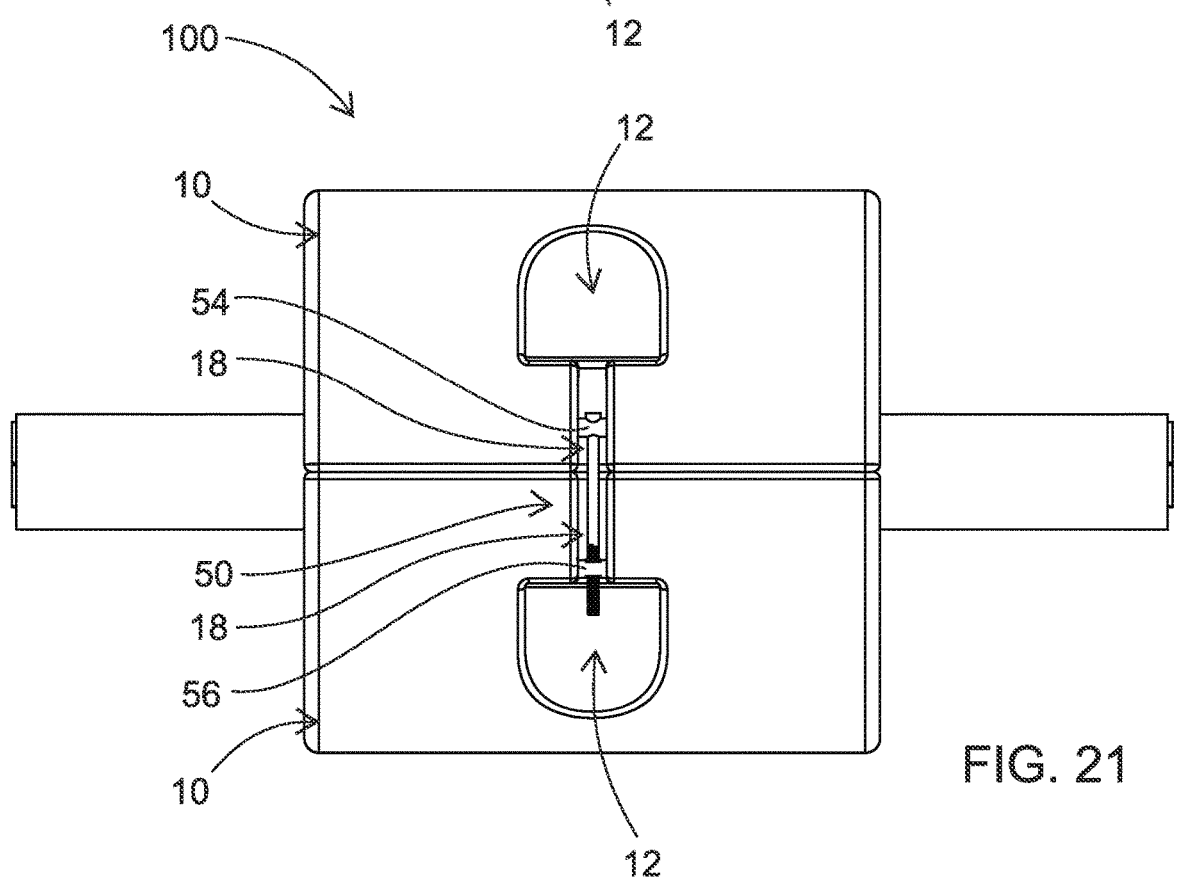
FIG. 21 is a side view of a buoyancy module of the present invention.
Figure 22:
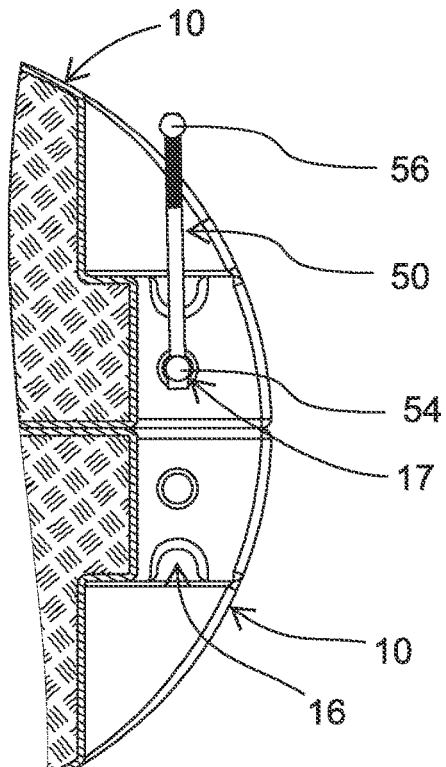
FIG. 22 is a detail cross section view of the recess portion of a buoyancy module of the present invention.
Figure 23:
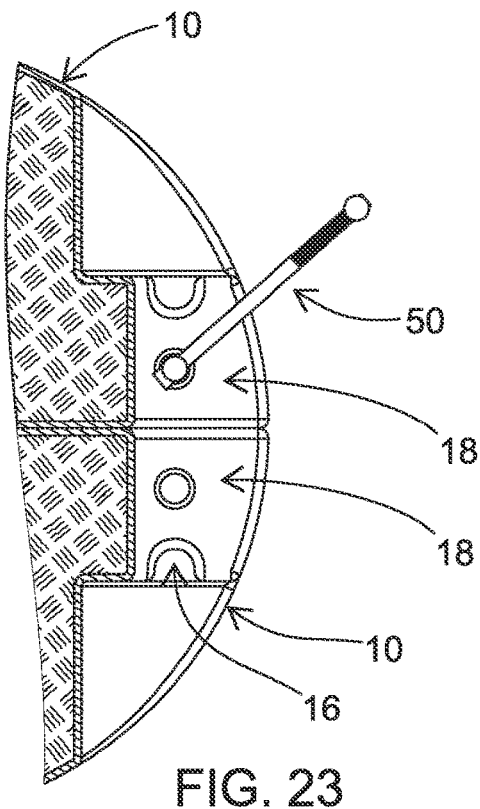
FIG. 23 is a detail cross section view of the recess portion of a buoyancy module of the present invention.
Figure 24:
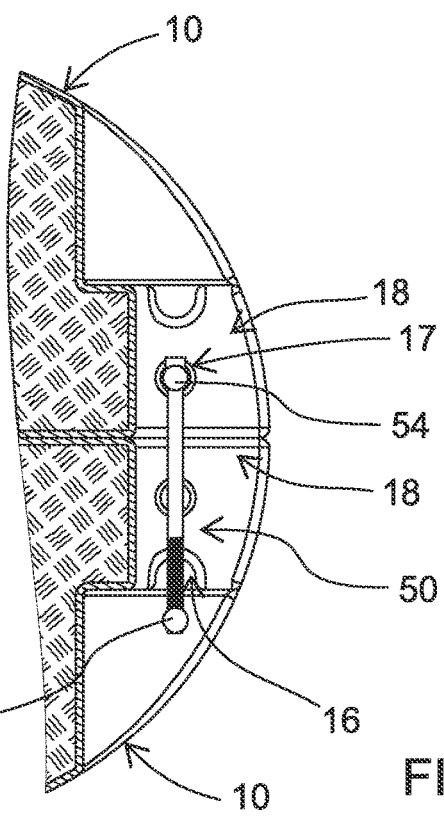
FIG. 24 is a detail cross section view of the recess portion of a buoyancy module of the present invention.
Figure 25:
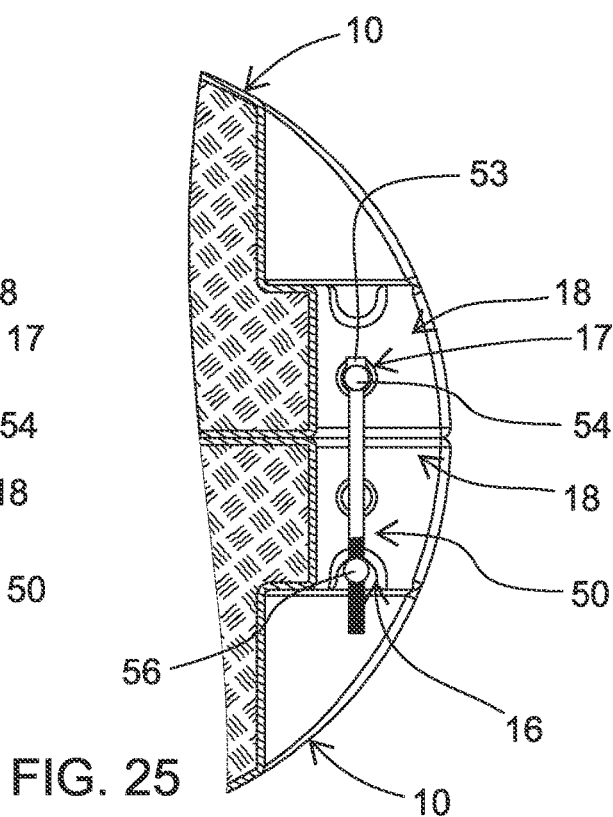
FIG. 25 is a detail cross section view of the recess portion of a buoyancy module of the present invention.
Figure 26:
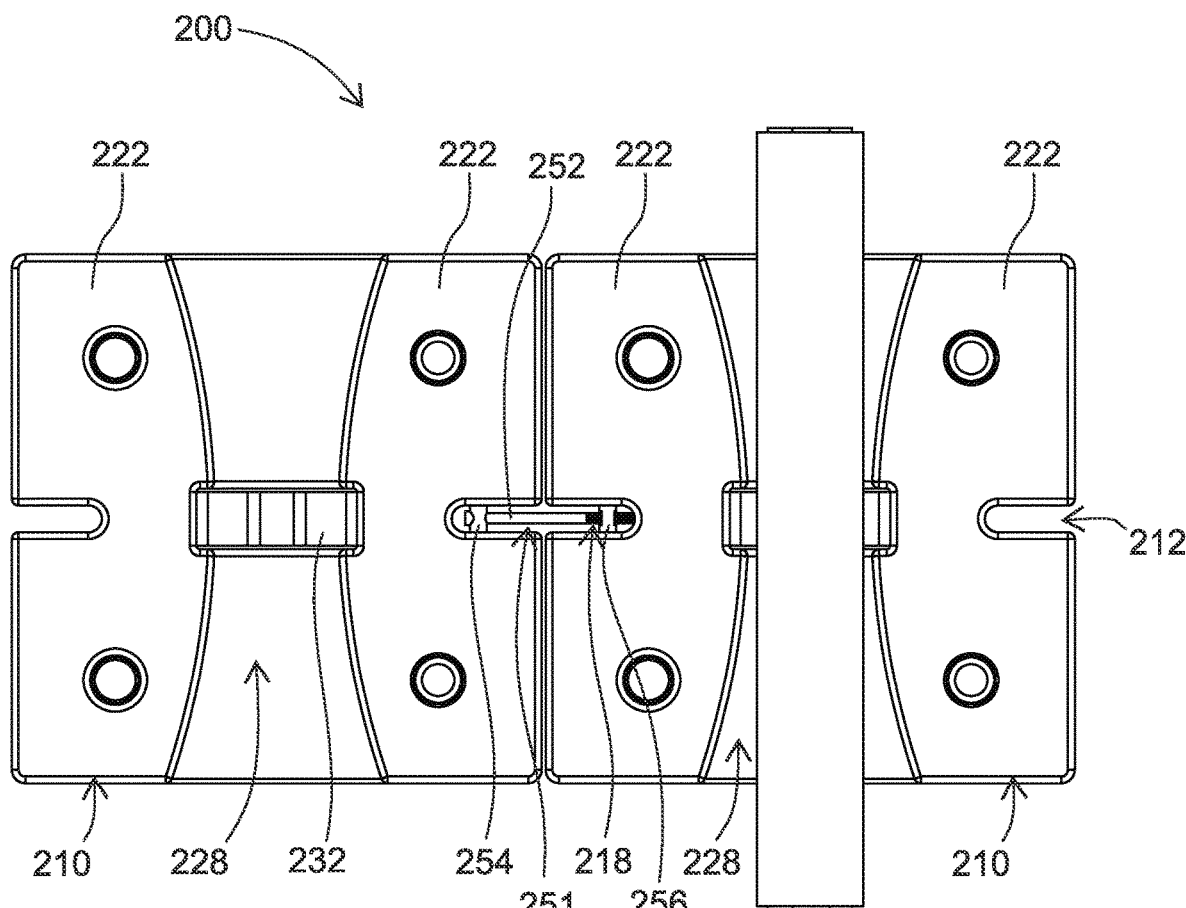
FIG. 26 is a top view of a buoyancy module of the present invention.
Figure 27:
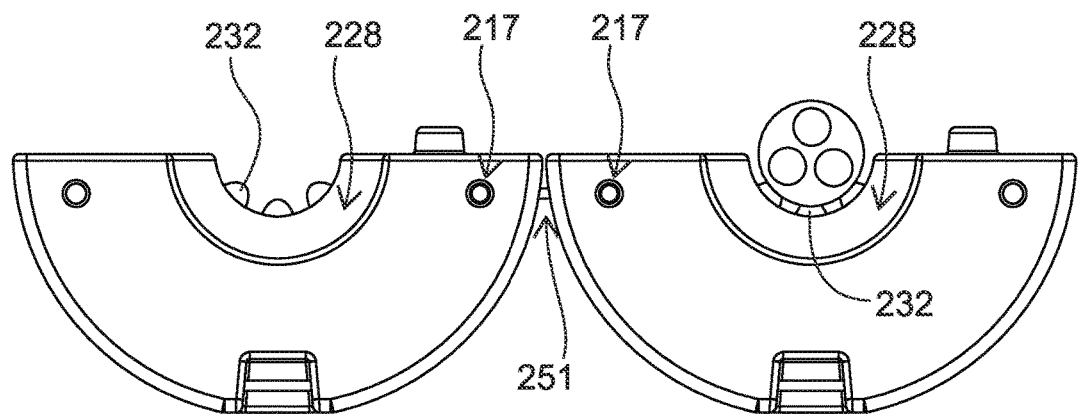
FIG. 27 is a front view of a buoyancy module of the present invention.
Figure 28:
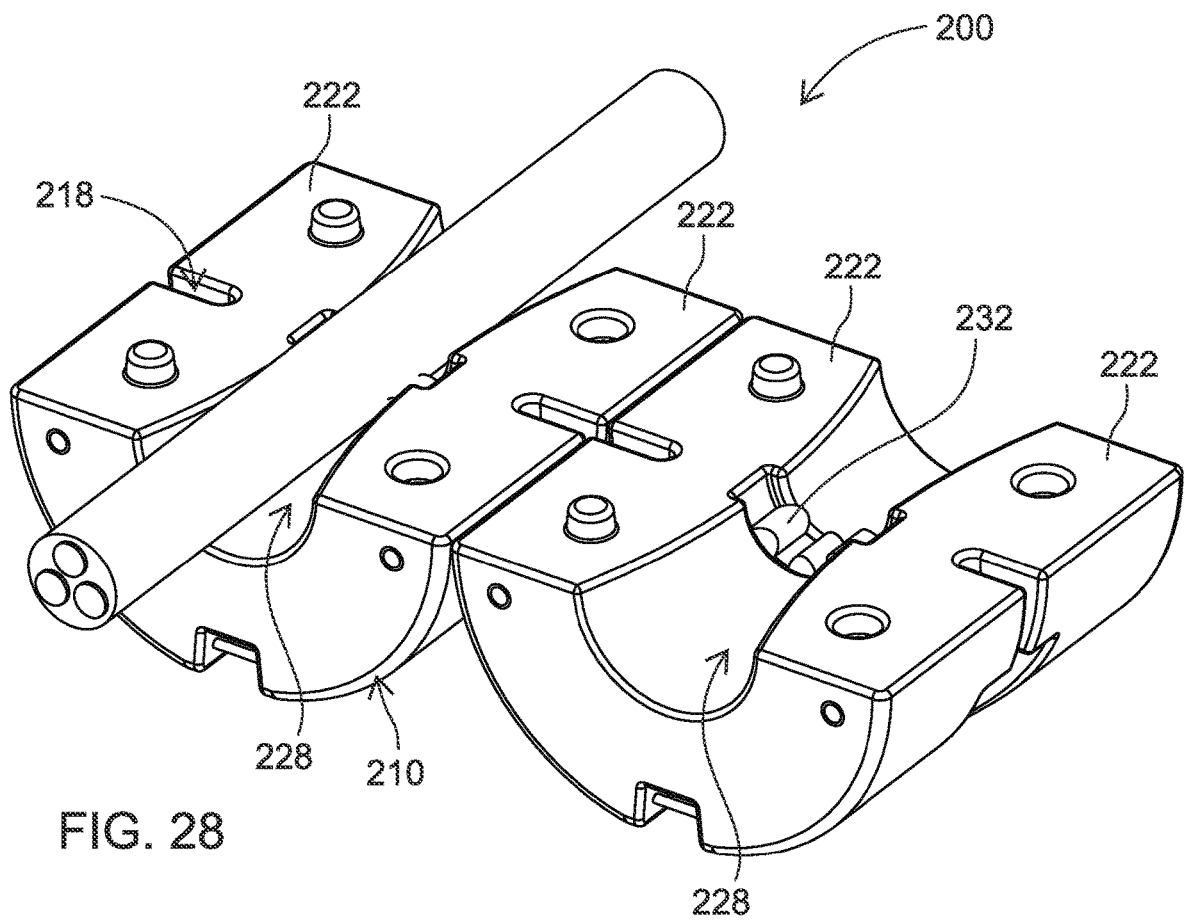
FIG. 28 is a perspective view of a buoyancy module of the present invention.
Figure 29:
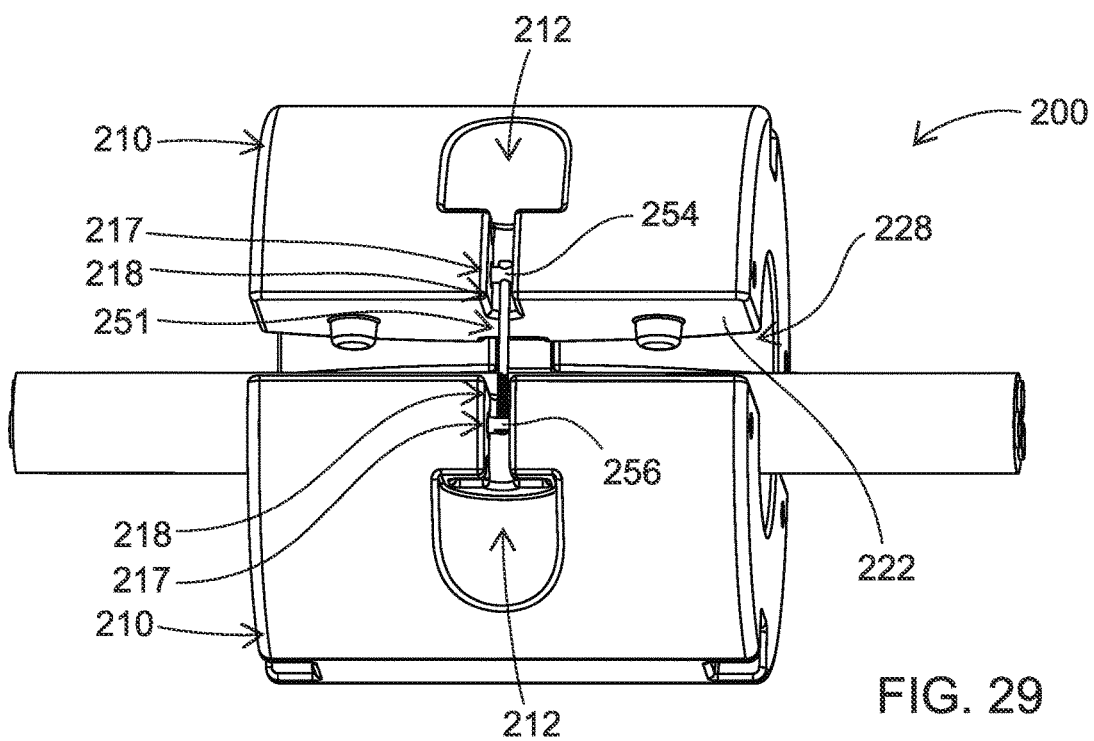
FIG. 29 is a perspective view of a buoyancy module of the present invention.
Figure 30:
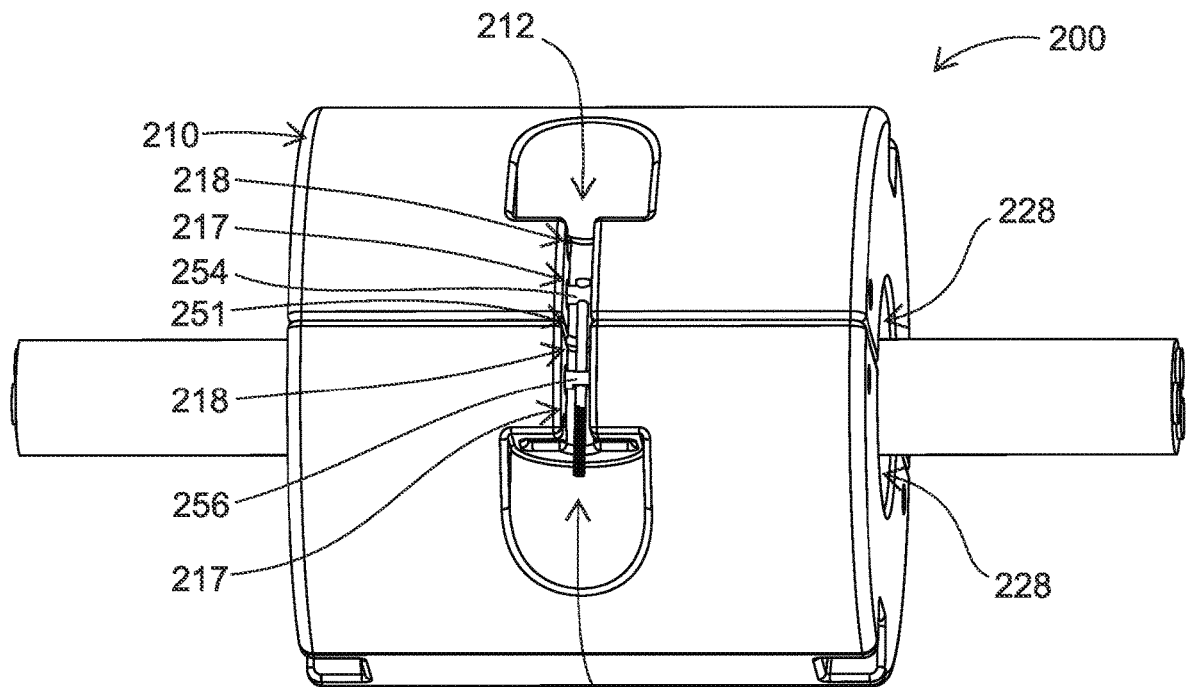
FIG. 30 is a perspective view of a buoyancy module of the present invention.
Figure 31:
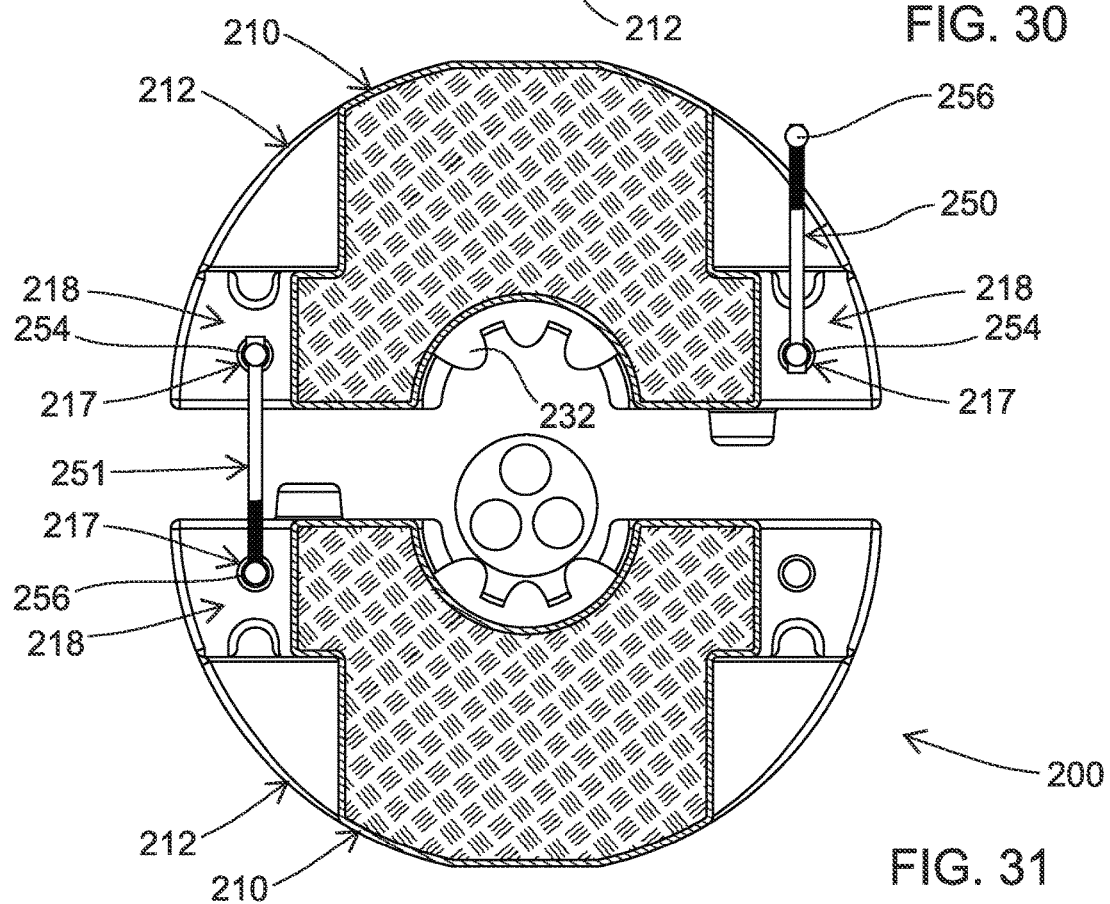
FIG. 31 is a cross section view of a buoyancy module of the present invention.
Figure 32:
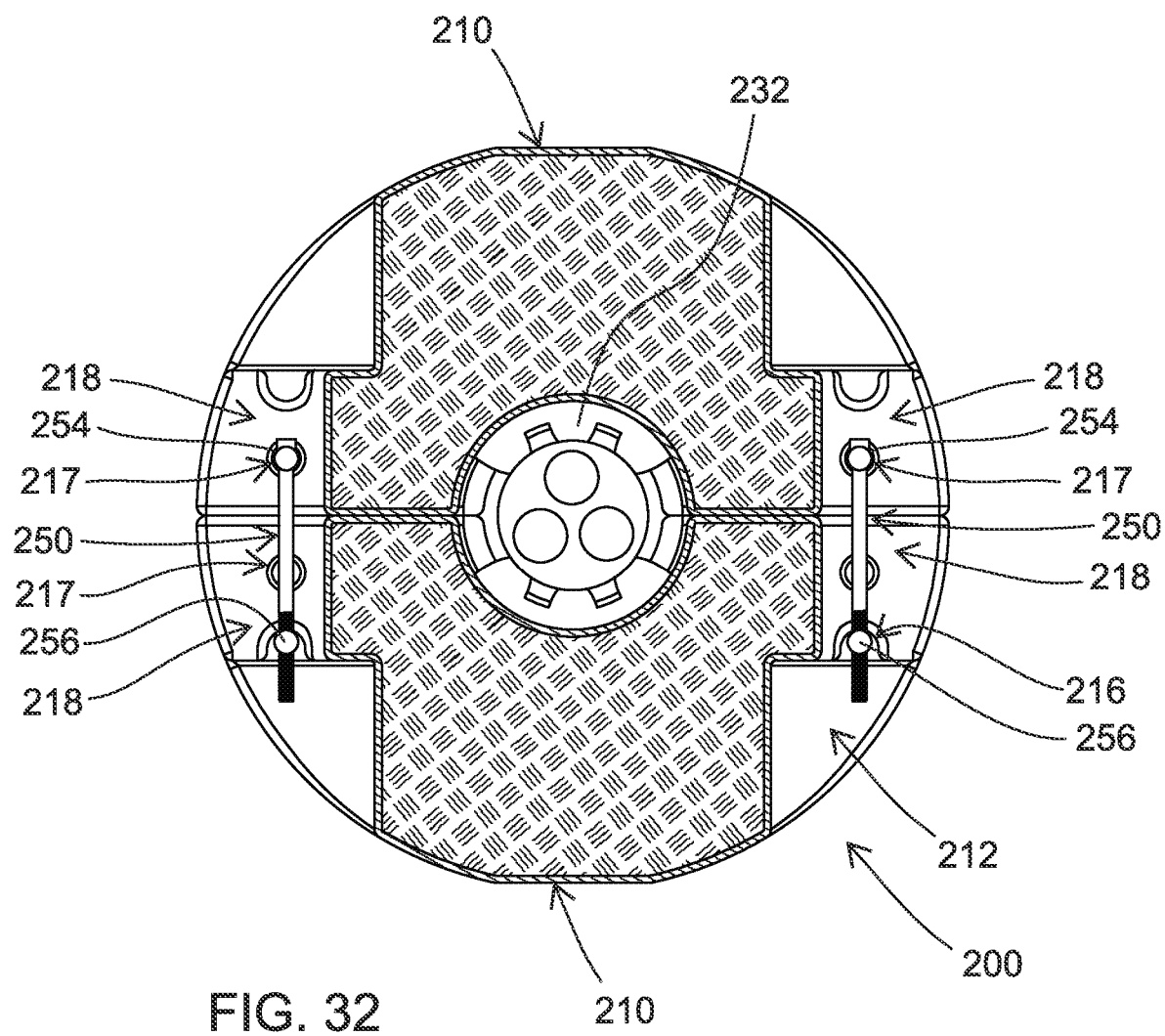
FIG. 32 is a cross section view of a buoyancy module of the present invention.
Figure 33:
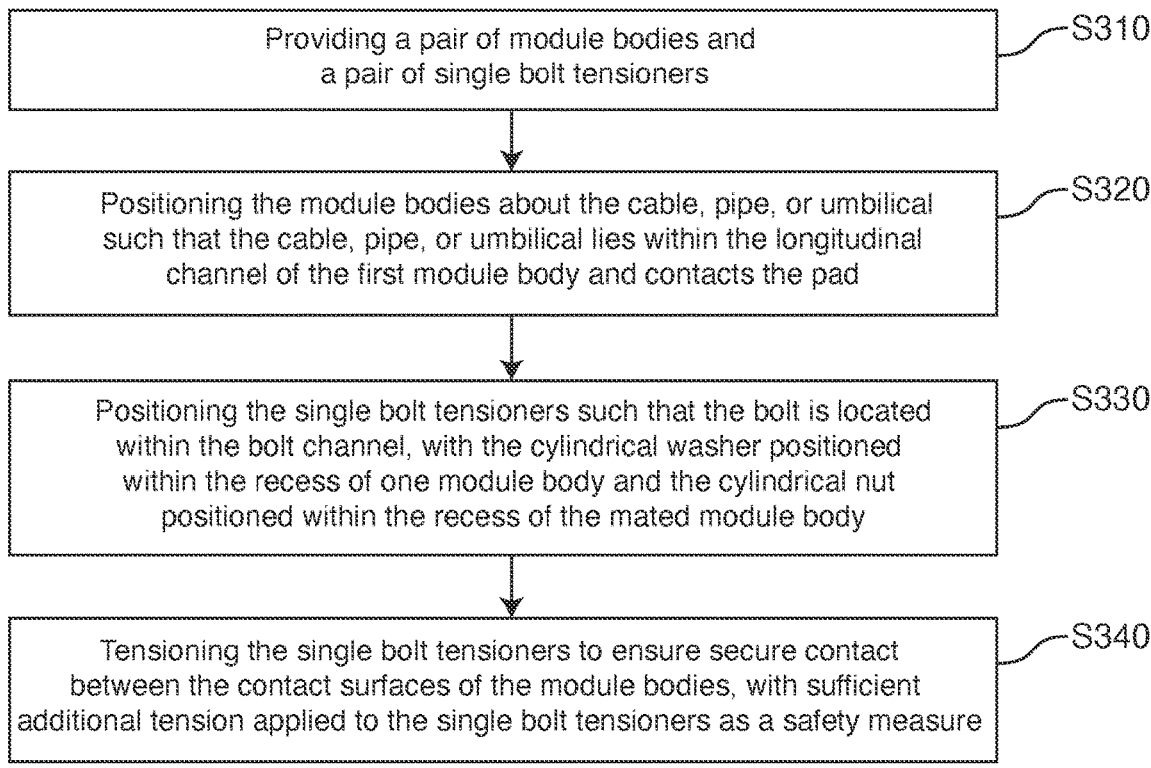
FIG. 33 shows the steps of one method of the present invention.
Figure 34:
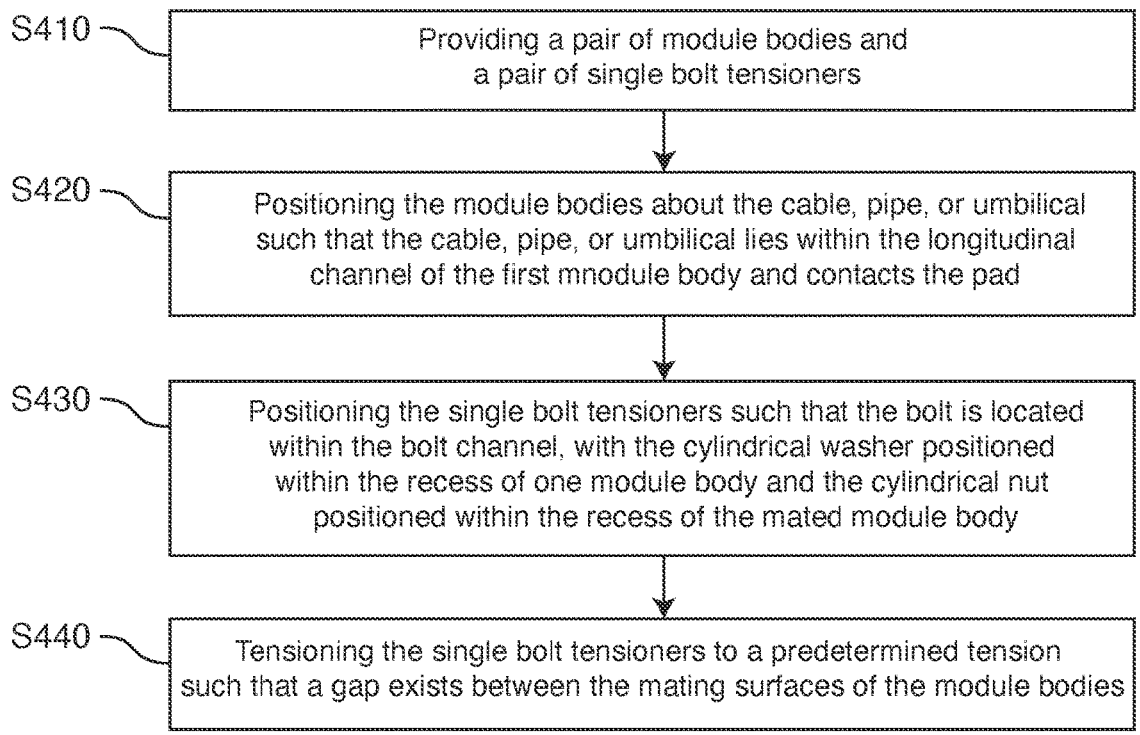
FIG. 34 shows the steps of one method of the present invention.
Figure 35:
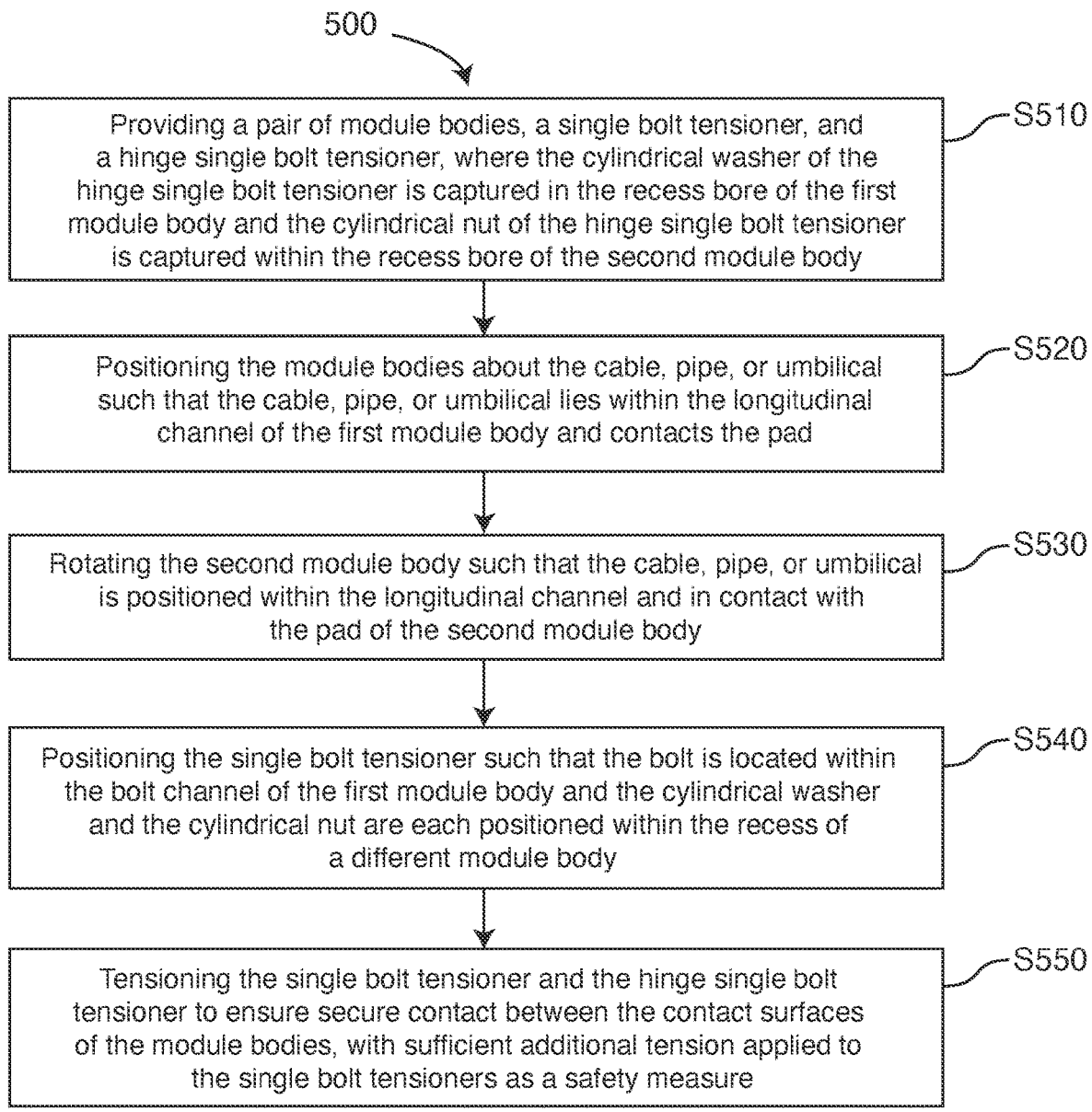
FIG. 35 shows the steps of one method of the present invention.
Figure 36:
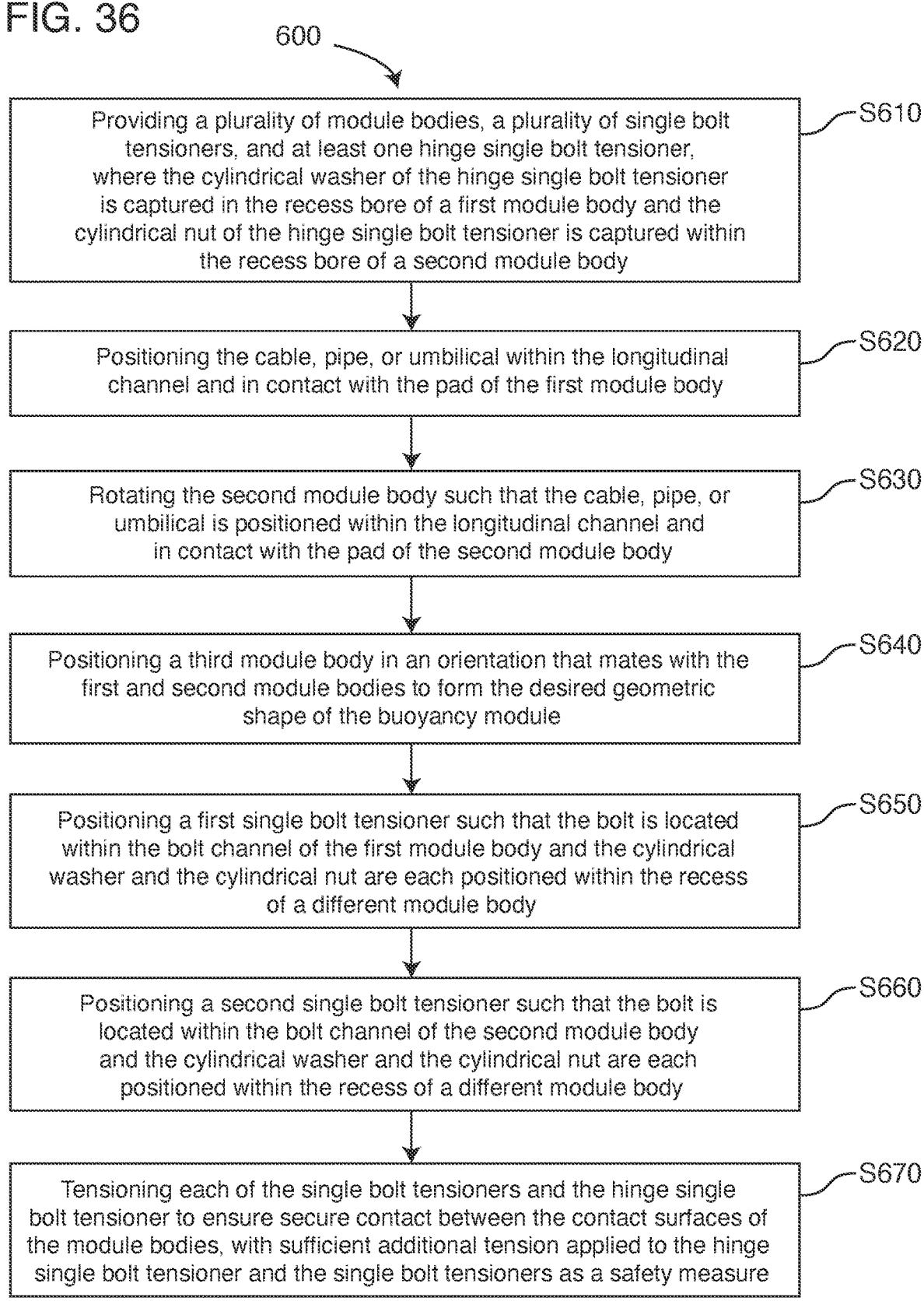
FIG. 36 shows the steps of one method of the present invention.

In one embodiment of the buoyancy module 100, a pair of module bodies 10 are mated and secured using a pair of free single bolt tensioners 50. As depicted in FIGS. 16 and 17, the module bodies 10 are mated such that a cable, pipe, or umbilical is positioned within the longitudinal channel 28 of each module body 10. As shown, the recesses 12 in each module body 10 are aligned such that the bolt channel 18 of each recess is in communication with the bolt channel 18 of the mated module body 10. Once the module bodies 10 are so aligned, single bolt tensioners 50 are installed within the recesses 12, such that the cylindrical washer 54 is located within the upper portion 14 of the recess 12 on one module body 10, the bolt 52 passing through the communicating bolt channels 18, and the cylindrical nut 56 is located within the upper portion 14 of the recess 12 of the mating module body 10. Upon tightening of the single bolt tensioners 50, the pair of module bodies 10 are brought together, creating a clamping force. This clamping force displaces the pad as it contacts the cable, pipe, or umbilical, resulting in a clamping pressure being applied to the cable, pipe, or umbilical. While the location of the cylindrical nut 54 and the cylindrical washer 56 are described in specific orientations, a person of skill in the art will appreciate that the arrangement of the cylindrical washer 54 and the cylindrical nut 56 may be reversed in any of the embodiments disclosed herein without deviating from the scope of the invention.

The clamping pressure applied to the cable, pipe, or umbilical is dependent on the physical characteristics of the pad 32. To properly determine the clamping pressure, the displacement curve of the pad 32 can be derived empirically or calculated based on a known or determined finite element analysis. Once the force displacement curve is determined, a known clamping force will create a known clamping pressure, enabling the determination of the appropriate geometry for the module bodies 10. In one embodiment of the invention, the single bolt tensioners 50 may be tightened to a predetermined tension, such that the mating surfaces 22 of the module bodies 10 do not contact each other. In this embodiment, adjustment of the tension of the single bolt tensioners 50 will result in adjustment of the clamping force and the corresponding clamping pressure exerted by the pads 32. Alternatively, in other embodiments of the invention it is desirable to engineer the geometry of the module bodies 10 such that contact between the contact surfaces 26 of the module bodies 10 generates a predetermined displacement of the pad 32, thereby imparting a known clamping force that results in the desired clamping pressure being applied by the pad 32. In these embodiments, the single bolt tensioners 50 are tensioned to ensure secure contact between the contact surfaces 26 of the module bodies 10, with sufficient additional tension applied to the single bolt tensioners 50 as a safety measure.

In embodiments where the module bodies 10 are in direct contact once the single bolt tensioners 50 are tensioned, the clamping pressure on the cable, pipe, or umbilical will be determined by the geometry of the cable, pipe, or umbilical, the geometry of the module body 10, and the properties of pad 32. Specifically, the dimensions and shape of the pad 32 and the relative position of the pad to the contact surfaces 26 will generate a known clamping pressure to a cable, pipe, or umbilical with a known outer diameter. For example, based on the known characteristics of a cable, such as diameter, coefficient of friction between the sheath of the cable and the pad 32, the maximum clamping pressure, and the known characteristics of the pad 32, a person of skill in the art can calculate the dimensions of the pad 32 and the relationship between the pad 32 and the contact surface 26 required to achieve the desired clamping pressure for the cable. Where precise application of clamping pressure is desired, the integration of a contact surface 26, with a precisely machined contact face 27 can be implemented to ensure that the required clamping pressure is achieved when the single bolt tensioners 50 are tensioned such that the module bodies 10 are in direct contact.

Further in one embodiment of the buoyancy module 100, a single buoyancy module 10 may be positioned such that a cable, pipe, or umbilical is positioned within the longitudinal channel 28 of the module body 10. A single bolt tensioner 50 is placed in the recess of the module body 10, with the bolt 52 positioned in the bolt channel 18, and the cylindrical washer 56 is engaged with a strap. The single bolt tensioner 50 may be tensioned to a desired tension in order to tighten the strap and secure the module body 10 to the cable, pipe, or umbilical. Further, in some embodiments a second single bolt tensioner 50 may be positioned in a second recess 12 of the module body 10, with the bolt 52 of the second single bolt tensioner 50 located in the second bolt channel 18, and the cylindrical washer 56 of the second single bolt tensioner 50 may engage the opposite end of the strap such that tensioning the first and second single bolt tensioners 50 to the desired tension will secure the module body 10 to the cable, pipe, or umbilical.

In some embodiments of the invention, it may be advantageous to capture the single bolt tensioner 50 in one or both of the module bodies. For example, FIGS. 18-25 depict an embodiment of the invention where the cylindrical washer 54 is captured within a recess bore 17 in the recess 12 of the module body 10. The recess bore 17 is sized to act as a bushing for the cylindrical washer 54, allowing the single bolt tensioner 50 to rotate about the axis of the recess bore 17. In some embodiments, the recess bore 17 may include an insert, such as a pipe or a tube to form or reinforce the recess bore 17. For example, a fiber reinforced pipe could be used as an insert during manufacturing to form the recess bore 17. Prior to mating the module bodies 10, it may be advantageous to have the single bolt tensioner 50 rotated such that the cylindrical washers 54 and the cylindrical nuts 56 of the single bolt tensioners 50 are both disposed within the recess 12 so that the pair of module bodies 10 can be mated without interference from the single bolt tensioners 50.

Once the module bodies 10 are mated, the single bolt tensioners 50 can be rotated such that the bolt 52 is disposed within the bolt channel 18 and the cylindrical nut 56 is located within the recess 12 of the mated module body 10. Upon tensioning of the single bolt tensioner 50, the cylindrical nut 56 contacts the cradle 16 of the mated module body 10. As detailed above, in embodiments where the module bodies 10 are designed to contact each other to achieve the desired clamping pressure, the single bolt tensioner 50 is tensioned to ensure secure contact between the contact surfaces 26 of the mating module bodies 10, with sufficient additional tension applied to the single bolt tensioners 50 as a safety measure. Alternatively, where the buoyancy module 100 is designed to leave a gap between the module bodies 10, the single bolt tensioner 50 is tensioned to a predetermined tensioning force to achieve the desired clamping pressure.

As shown in FIGS. 18-21, multiple single bolt tensioners 50 may be captured in the same module body 10, and the mating module body 10 may be set to receive the cylindrical nuts 56 of the captured single bolt tensioners 50. Alternatively, both module bodies 10 may include a single bolt tensioner 50, such that once the module bodies 10 are mated, the single bolt tensioners 50 may be rotated into the recess 12 of the mated module body 10 and each of the single bolt tensioners 50 may be tensioned to achieve the desired clamping pressure. In addition, while the figures depict a pair of single bolt tensioners 50 securing the buoyancy module 100, a person of skill in the art will appreciate that the module bodies 10 may utilize a plurality of single bolt tensioners 50 depending on factors such as spreading load, managing torque, or redundancy.

It is noted that while the single bolt tensioner 50 is described with the cylindrical washer 54 captured within the recess bore 17, the arrangement can be reversed and the cylindrical nut 56 may be captured within the recess bore 17 such that the single bolt tensioner 50 can rotate about the axis of the recess bore 17. In such arrangements, the cylindrical washer 54 will contact the cradle when the single bolt tensioner 50 is tensioned.

Turning to FIGS. 26-32, an embodiment of the buoyancy module 200 is shown. The buoyancy module 200 includes a pair of module bodies 210 connected by a single bolt tensioner 250 and a hinge single bolt tensioner 251. The hinge single bolt tensioner 251 having a cylindrical washer 254 captured in the recess bore 217 of a first module body 210 and a cylindrical nut 256 captured in a recess bore 217 of a second module body 210 such that the module bodies 210 may rotate like a clamshell to encircle a cable, pipe, or umbilical. Similar to the module body 10 described previously, the module body 210 may include a contact surface 226, which may correspond to the entirety of a mating surface 222 or may be a portion of the mating surface 222. Further, the single bolt tensioner 250 may be either a free single bolt tensioner 50 or a captured single bolt tensioner 50 as described above.

Alternatively, the buoyancy module 200 may utilize a fixed hinge in place of the hinge single bolt fastener 251. In such embodiments, the fixed hinge may take any form known in the art that fixes the module bodies 210 in a hinged arrangement. For example, the module bodies 210 may include fingers, which interlace and are connected using a rod or pin to create a fixed hinge.

Turning to a first method 300 of installing a buoyancy module 100 on a cable, pipe, or umbilical, a first step S310 includes providing a pair of module bodies 10 and a pair of single bolt tensioners 50. The single bolt tensioners 50 may each be free from the module bodies 10; both single bolt tensioners 50 may be captured within a bore recess 17 in the same module body; or the first single bolt tensioner 50 may be captured within a recess bore 17 of the first module body 10 and the second single bolt tensioner 50 may be captured within a recess bore 17 of the second module body 10. A second step S320 includes positioning the module bodies 10 about the cable, pipe, or umbilical such that the cable, pipe, or umbilical lies within the longitudinal channels 28 and contacts the pads 32. A third step S330 includes positioning the single bolt tensioners 50 such that the bolt 52 is located within the bolt channel 18, with the cylindrical washer 54 positioned within the recess 12 of one module body 10 and the cylindrical nut 56 positioned within the recess 12 of the mated module body 10. A fourth step S340 includes tensioning the single bolt tensioners 50 to ensure secure contact between the contact surfaces 26 of the module bodies 10, with sufficient additional tension applied to the single bolt tensioners 50 as a safety measure.

Turning to a second method 400 of installing a buoyancy module 100 on a cable, pipe, or umbilical, a first step S410 includes providing a pair of module bodies 10 and a pair of single bolt tensioners 50. The single bolt tensioners 50 may each be free from the module bodies 10; both single bolt tensioners 50 may be captured within a bore in the same module body; or the first single bolt tensioner 50 may be captured within a recess bore 17 of the first module body 10 and the second single bolt tensioner 50 may be captured within a recess bore 17 of the second module body 10. A second step S420 includes positioning the module bodies 10 about the cable, pipe, or umbilical such that the cable, pipe, or umbilical lies within the longitudinal channels 28 and contacts the pads 32. A third step S430 includes positioning the single bolt tensioners 50 such that the bolt 52 is located within the bolt channel 18, with the cylindrical washer 54 positioned within the recess 12 of one module body 10 and the cylindrical nut 56 positioned within the recess 12 of the mated module body 10. A fourth step S440 includes tensioning the single bolt tensioners 50 to a predetermined tension such that a gap exists between the mating surfaces 22 of the module bodies 10.

Turning to a third method 500 of installing a buoyancy module 200 on a cable, pipe, or umbilical, a first step S510 includes providing a pair of module bodies 210, a single bolt tensioner 250, and a hinge single bolt tensioner 251, where the cylindrical washer 254 of the hinge single bolt tensioner 251 is captured in the recess bore 217 of the first module body 210 and the cylindrical nut 256 of the hinge single bolt tensioner 251 is captured within the recess bore 217 of the second module body 210. The single bolt tensioner 250 may be free from the module bodies 210 or the second single bolt tensioner 250 may be captured within a recess bore 217 of either the first or second module body 210. A second step S520 includes positioning the cable, pipe, or umbilical within the longitudinal channel 228 and in contact with the pad 232 of the first module body 210. A third step S530 includes rotating the second module body 210 such that the cable, pipe, or umbilical is positioned within the longitudinal channel 228 and in contact with the pad 232 of the second module body 210. A fourth step S540 includes positioning the single bolt tensioner 250 such that the bolt 252 is located within the bolt channel 218 of the first module body 210 and such that the cylindrical washer 254 and the cylindrical nut 256 are each positioned within the recess of a different module body 210. A fifth step S550 includes tensioning the single bolt tensioner 250 and the hinge single bolt tensioner 251 to ensure secure contact between the contact surfaces 226 of the module bodies 210, with sufficient additional tension applied to the single bolt tensioners 250 as a safety measure. Alternatively, the fifth step S550 may include tensioning the single bolt tensioner 250 and the hinge single bolt tensioner 251 to a predetermined tension such that a gap exists between the mating surfaces 222 of the module bodies 210.

Turning to a fourth method 600 of installing a buoyancy module 200 on a cable, pipe, or umbilical, a first step S610 includes providing a plurality of module bodies 210, a plurality of single bolt tensioners 250, and at least one hinge single bolt tensioner 251, where the cylindrical washer 254 of the hinge single bolt tensioner 251 is captured in the recess bore 217 of a first module body 210 and the cylindrical nut 256 of the hinge single bolt tensioner 251 is captured within the recess bore 217 of a second module body 210. The plurality of single bolt tensioners 250 may be free from the module bodies 210 or each of the plurality of single bolt tensioners 250 may be captured within a recess bore 217 of any of the plurality of module bodies 210. A second step S620 includes positioning the cable, pipe, or umbilical within the longitudinal channel 228 and in contact with the pad 232 of the first module body 210. A third step S630 includes rotating the second module body 210 such that the cable, pipe, or umbilical is positioned within the longitudinal channel 228 and in contact with the pad 232 of the second module body 210. A fourth step S640 includes positioning a third module body 210 in an orientation that mates with the first and second module bodies 210 to form the desired geometric shape of the buoyancy module 200. A fifth step S650 includes positioning a first single bolt tensioner 250 such that the bolt 252 is located within the bolt channel 218 of the first module body 210 and the cylindrical washer 254 and the cylindrical nut 256 are each positioned within the recess of a different module body 210. A sixth step S660 includes positioning a second single bolt tensioner 250 such that the bolt 252 is located within the bolt channel 218 of the second module body 210 and the cylindrical washer 254 and the cylindrical nut 256 are each positioned within the recess of a different module body 210. A seventh step S670 includes tensioning each of the single bolt tensioners 250 and the hinge single bolt tensioner 251 to ensure secure contact between the contact surfaces 226 of the module bodies 210, with sufficient additional tension applied to the hinge single bolt tensioner 251 and the single bolt tensioners 250 as a safety measure. Alternatively, the seventh step S670 may include tensioning each of the single bolt tensioners 250 and the hinge single bolt tensioner 251 to a predetermined tension such that a gap exists between the mating surfaces 222 of the module bodies 210.

It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:
1. A buoyancy module comprising:
   a first and second module body, the first module body adapted to mate with the second module body, wherein each module body includes at least one recess comprising an upper portion and a bolt channel;
   the first and second module body each further comprising a contact face, the contact face of the first module body positioned and configured to align with the contact face of the second module body when the first and second module bodies are mated, wherein the first and second module body are each machined to remove material such that the contact face of the first module body and the contact face of the second module body are both comprised of a foam;

a longitudinal channel running the length of at least the first module body, the longitudinal channel having a pad containment channel located therein;

a pad positioned within the pad containment channel; and at least one single bolt tensioner, the at least one single bolt tensioner comprising a bolt, a cylindrical washer, and a cylindrical nut, wherein the at least one single bolt tensioner is positioned such that the bolt lies within the bolt channel of the first module body and the bolt channel of the second module body.

2. The buoyancy module of claim 1, wherein the bolt is an extended bolt.

3. The buoyancy module of claim 1, further comprising an alignment nut positioned along the bolt.

4. The buoyancy module of claim 1, wherein the at least one recess is a plurality of recesses and the at least one single bolt tensioner is a plurality of single bolt tensioners, wherein each of the plurality of single bolt tensioners is positioned such that the bolt of each of the plurality of single bolt tensioners lies within a bolt channel of the first module body and a bolt channel of the second module body.

5. The buoyancy module of claim 1, wherein an interior portion of each of the first and second module body are filled with a foam.

6. The buoyancy module of claim 5, wherein the foam is syntactic foam.

7. The buoyancy module of claim 1, wherein the pad containment channel is recessed within the longitudinal channel.

8. The buoyancy module of claim 1, wherein the pad containment channel is formed using a plurality of protrusions.

9. The buoyancy module of claim 1, wherein the first module body further comprises a mating surface having an alignment protrusion and the second module body further comprises a mating surface having an alignment recess, the alignment protrusion of the first module body configured to align with the alignment recess of the second module body when the first and second module body are mated.

10. The buoyancy module of claim 1, wherein the first and second module body each further comprise a contact surface, the contact surface of the first module body positioned and configured to align with the contact surface of the second module body when the first and second module bodies are mated.

11. The buoyancy module of claim 1, wherein the pad is comprised of a high friction material selected from the group of: EPDM rubber, neoprene rubber, natural rubber, and polyurethane.

12. A method of installing a buoyancy module on a cable, pipe, or umbilical, the method comprising:
   a. providing a buoyancy module comprising:
      i. a first and second module body, the first module body adapted to mate with the second module body, wherein each module body includes a plurality of recesses, each recess comprising an upper portion and a bolt channel;
      ii. the first and second module body each further comprising a contact face, the contact face of the first module body positioned and configured to align with the contact face of the second module body when the first and second module bodies are mated, wherein the first and second module body are each machined to remove material such that the contact face of the first module body and the contact face of the second module body are both comprised of a foam;
      iii. a longitudinal channel running the length of at least the first module body, the longitudinal channel having a pad containment channel located therein;
      iv. a pad positioned within the pad containment channel; and
      v. a first and second single bolt tensioner, each of the first and second single bolt tensioner comprising a bolt, a cylindrical washer, and a cylindrical nut;
   b. positioning the first and second module body about a cable, pipe, or umbilical such that the cable, pipe, or umbilical lies within the longitudinal channel of the first module body and contacts the pad;
   c. positioning the first and second single bolt tensioner such that each bolt is located within the bolt channel of the first and second module body and each cylindrical nut is positioned in a recess of one of the first and second module body and each cylindrical washer is positioned in a recess of the other of the first and second module body; and
   d. tensioning the first and second single bolt tensioner to mate the first and second module body.

\* \* \* \* \*